United States Patent
Maes

(10) Patent No.: US 11,228,497 B2
(45) Date of Patent: Jan. 18, 2022

(54) TOPOLOGY BASED MANAGEMENT WITH STAGE AND VERSION POLICIES

(71) Applicant: HEWLETT PACKARD ENTERPRISE DEVELOPMENT LP, Houston, TX (US)

(72) Inventor: Stephane H. Maes, Fremont, CA (US)

(73) Assignee: Micro Focus LLC, Santa Clara, CA (US)

(*) Notice: Subject to any disclaimer, the term of this patent is extended or adjusted under 35 U.S.C. 154(b) by 427 days.

(21) Appl. No.: 15/515,780

(22) PCT Filed: Sep. 30, 2014

(86) PCT No.: PCT/US2014/058330
§ 371 (c)(1),
(2) Date: Mar. 30, 2017

(87) PCT Pub. No.: WO2016/053301
PCT Pub. Date: Apr. 7, 2016

(65) Prior Publication Data
US 2017/0302532 A1  Oct. 19, 2017

(51) Int. Cl.
*H04L 12/24* (2006.01)
*H04L 29/06* (2006.01)
*H04L 29/08* (2006.01)

(52) U.S. Cl.
CPC .......... *H04L 41/12* (2013.01); *H04L 41/0893* (2013.01); *H04L 41/5041* (2013.01);
(Continued)

(58) Field of Classification Search
CPC . H04L 67/10; H04L 41/0893; H04L 41/5041; H04L 41/12; H04L 41/5048;
(Continued)

(56) References Cited

U.S. PATENT DOCUMENTS 6,574,663 B1 * 6/2003 Bakshi .................. H04L 41/12
709/220
7,702,740 B2  4/2010 Srinivasan et al.
(Continued)

FOREIGN PATENT DOCUMENTS

EP  2482148 A1  8/2012
EP  2760160 A1  7/2014
(Continued)

OTHER PUBLICATIONS

Cisco, "Benefits of Cisco Application Centric Infrastructure and Openstack," White Paper, Jun. 18, 2014, 4 pages, available at http://www.cisco.com/c/en/us/solutions/collatera.
(Continued)

*Primary Examiner* — Suraj M Joshi

(57) ABSTRACT

In one implementation, a method for topology based management with stage and version policies can include associating a topology of an application under development, determining a number of policies, wherein the number of policies include stage and version policies that define a number of available infrastructures for a given stage and version of the application, associating the number of policies to a number of nodes of the topology, and provisioning the topology with the associated number of policies.

20 Claims, 10 Drawing Sheets

(52) U.S. Cl.
CPC ...... *H04L 41/5048* (2013.01); *H04L 63/1416* (2013.01); *H04L 63/20* (2013.01); *H04L 67/14* (2013.01); *H04L 67/16* (2013.01); *H04L 41/5096* (2013.01); *H04L 63/02* (2013.01)

(58) Field of Classification Search
CPC ..... H04L 63/1416; H04L 63/20; H04L 67/14; H04L 67/16
USPC .......................................................... 709/223
See application file for complete search history.

(56) References Cited

U.S. PATENT DOCUMENTS

| | | | | |
|---|---|---|---|---|
| 9,645,628 | B1* | 5/2017 | Loafman | G06F 9/5027 |
| 2010/0088150 | A1* | 4/2010 | Mazhar | H04L 41/0806 |
| | | | | 717/120 |
| 2010/0095266 | A1* | 4/2010 | Novak | G06F 8/71 |
| | | | | 717/101 |
| 2011/0265164 | A1* | 10/2011 | Lucovsky | G06F 9/45533 |
| | | | | 726/7 |
| 2012/0174124 | A1 | 7/2012 | Ward et al. | |
| 2012/0227039 | A1* | 9/2012 | Ferdman | G06F 9/5027 |
| | | | | 718/1 |
| 2012/0239739 | A1 | 9/2012 | Manglik et al. | |
| 2013/0014107 | A1* | 1/2013 | Kirchhofer | G06F 9/5083 |
| | | | | 718/1 |
| 2013/0103837 | A1* | 4/2013 | Krueger | G06F 9/5072 |
| | | | | 709/226 |
| 2013/0219361 | A1* | 8/2013 | Fiebig | G06F 8/70 |
| | | | | 717/121 |
| 2013/0268638 | A1 | 10/2013 | Anderson et al. | |
| 2014/0019597 | A1 | 1/2014 | Nath et al. | |
| 2014/0067779 | A1* | 3/2014 | Ojha | G06F 16/1734 |
| | | | | 707/694 |
| 2014/0108665 | A1 | 4/2014 | Arora et al. | |
| 2015/0199188 | A1* | 7/2015 | Mantripragada | G06F 8/60 |
| | | | | 717/101 |

FOREIGN PATENT DOCUMENTS

| | | |
|---|---|---|
| WO | WO-2013072925 A2 | 5/2013 |
| WO | WO-2013184140 | 12/2013 |

OTHER PUBLICATIONS

International Search Report & Written Opinion received in PCT Application No. PCT/US2014/058330, dated Jun. 10, 2015, 12 pages.

* cited by examiner

TOPOLOGY BASED MANAGEMENT WITH STAGE AND VERSION POLICIES

BACKGROUND

An increasingly larger number of business entities and individuals are turning to cloud computing and the services provided through a cloud computing system in order to, for example, sell goods or services, maintain business records, and provide individuals with access to computing resources, among other cloud-related objectives. Cloud computing provides consumers of the cloud with scalable and pooled computing, storage, and networking capacity as a service or combinations of such services built on the above. A cloud may be designed, provisioned, deployed, and maintained by or for the entity for which the cloud computing system is created. Designing, provisioning, deploying, and maintaining a cloud computing system may be a difficult task.

DETAILED DESCRIPTION

Figure 1:
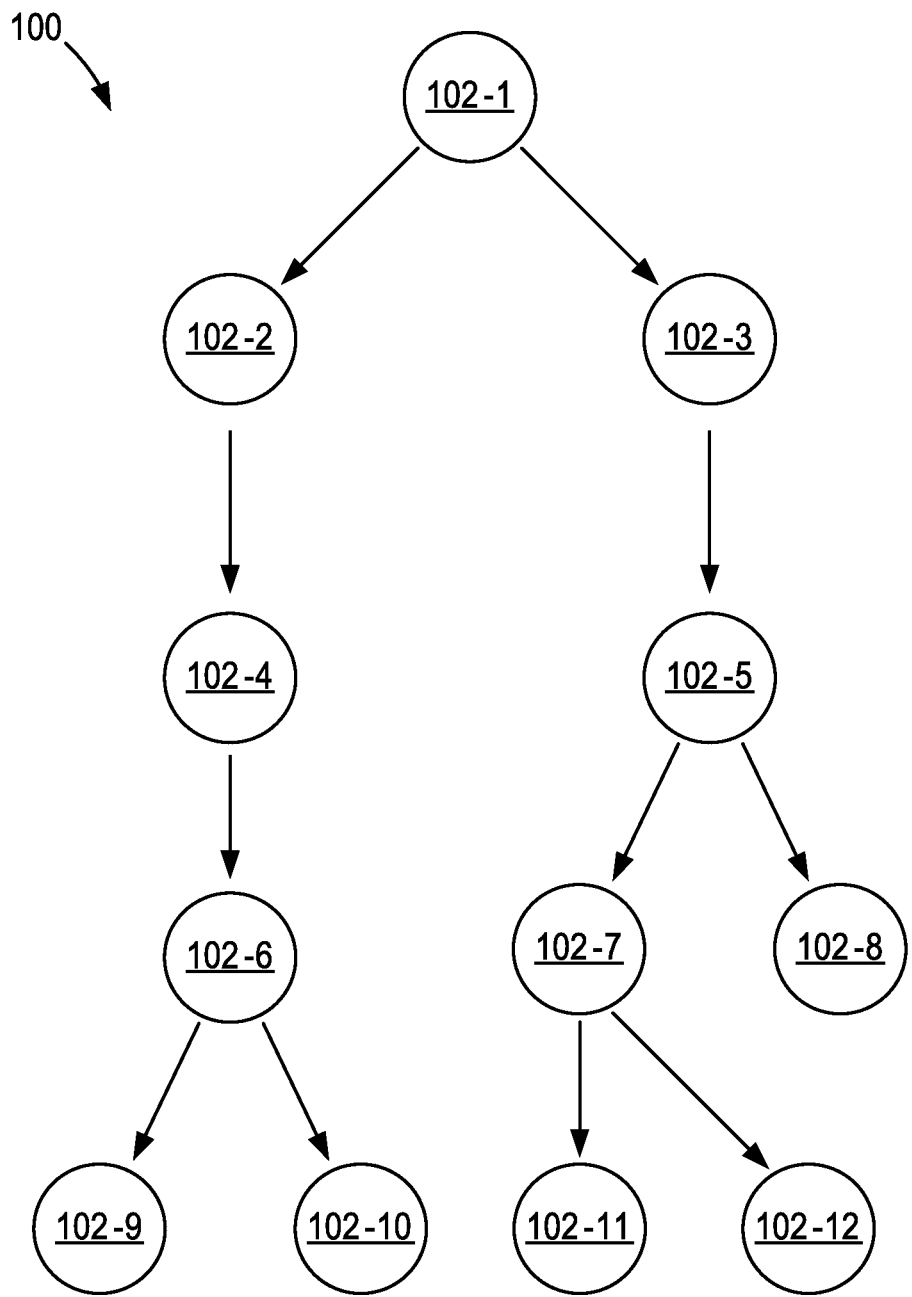
FIG. 1 is a block diagram of a blueprint, according to the present disclosure.

In previous cloud computing environments, stage and version policies can be stand-alone products and/or portions of a cloud computing platform. In addition, previous cloud computing environments can include stage and version policies that are not based on a topology of the cloud computing environment. In some embodiments of the present disclosure, the systems and methods can include stage and version policies that are based on the topology of the cloud computing environments and mapped to the topology and/or topology instances. Advantages of the embodiments of the present disclosure over the previous systems and method by: providing support for second day operation without first day operation, providing support for CSA, and/or provide stage and version policies that are compatible with legacy systems.

Cloud computing provides services for a users data, software, and computation. Applications deployed on resources within the cloud service may be manually deployed. This manual deployment consumes considerable administrative time. The manual steps of deploying an application may include the provisioning and instantiation of the infrastructure. This may include linking the installation of an application or a platform such as middleware and DB+ applications or deployment of an image with or without the full knowledge of the deployed infrastructure. Manual deployment may further include numerous sequences of steps launched by a user who attempts to deploy the application. Thus, the manual linking of an application to a deployed infrastructure consumes large amounts of computing and personnel resources, and may lead to mistakes and irreconcilable issues between the application and the underlying infrastructure. Linking of an application to a deployed infrastructure may be automated with a number of tools, scripts, and executables, with orchestrators automating the sequence of execution of these processes. A number of devices used in the designing, provisioning, deploying, and maintaining of applications deployed on resources within the cloud service may include data centers, private clouds, public clouds, managed clouds, hybrid clouds, and combinations thereof.

More specifically, cloud services provided to users over a network may be designed, provisioned, deployed, and managed using a cloud service manager. The cloud service provider or other entity or individual designs, provisions, deploys, and manages such a cloud service that appropriately consists of a number of services, applications, platforms, or infrastructure capabilities deployed, executed, and managed in a cloud environment. These designs may then be offered to user who may order, request, and subscribe to them from a catalog via a market place or via an API call, and then manage the lifecycles of a cloud service deployed based on the designs through the same mechanism. The service designs in a cloud service manager such as CLOUD SERVICE AUTOMATION (CSA 3.2) designed and distributed by Hewlett Packard Corporation, described in more detail below, are expressed with "blueprints."

Blueprints describe services in terms of the collections of workflows that are to be executed to provision or manage all the components that make up the service in order to perform a particular lifecycle management action. Some of the functions of the workflows defined by blueprints are actual life cycle management actions that are then performed as calls to a resource provider. The resource provider converts the calls into well formed and exchanged instructions specific to the particular resource or instance offered by a resource provider.

FIG. 1 is a block diagram of a blueprint (100), according to one example of the principles described herein. Each object (102-1, 102-2, 102-3, 102-4, 102-5, 102-6, 102-7, 102-8, 102-9, 102-10, 102-11, 102-12) in the blueprint may be associated with action workflows that call resource providers. A number of challenges exist with a blueprint (100) approach to designing, provisioning, deploying, and managing cloud services. The structure of a blueprint, while consisting of objects comprising properties and actions linked by relationships, do not identify relationships to physical topologies such as, for example, the actual physical architecture of the system that supports the cloud service. This renders it difficult to associate additional metadata with the blueprints (100) to describe, for example, policies associated with the system. Further, this association of policies with nodes in a blueprint (100) is not intuitive for a designer or administrator of the to-be-deployed cloud service.

Further, the structures of blueprints (100), for the same reason, are difficult to use as models of applications or templates of infrastructures as CONTINUOUS DELIVERY AUTOMATION (CDA) does. CDA is system tool utilized within a topology designer that independently models infrastructure and application requirements while managing versions, configurations, and other application components. CDA 1.2 is also developed and distributed by Hewlett Packard Corporation. The structures of blueprints (100), for the same reason given above, are difficult to use as models of applications because blueprints do not describe the architecture of the application. Further, blueprints are difficult to use as templates of an infrastructure because they also do not describe the architecture of the infrastructure. As a result, systems aiming at modeling application models and infrastructure or platform templates, and mapping the application models and infrastructure or platform templates to each other are not easily reconciled with the blueprints because they are based on different methods of modeling these services.

Figure 2:
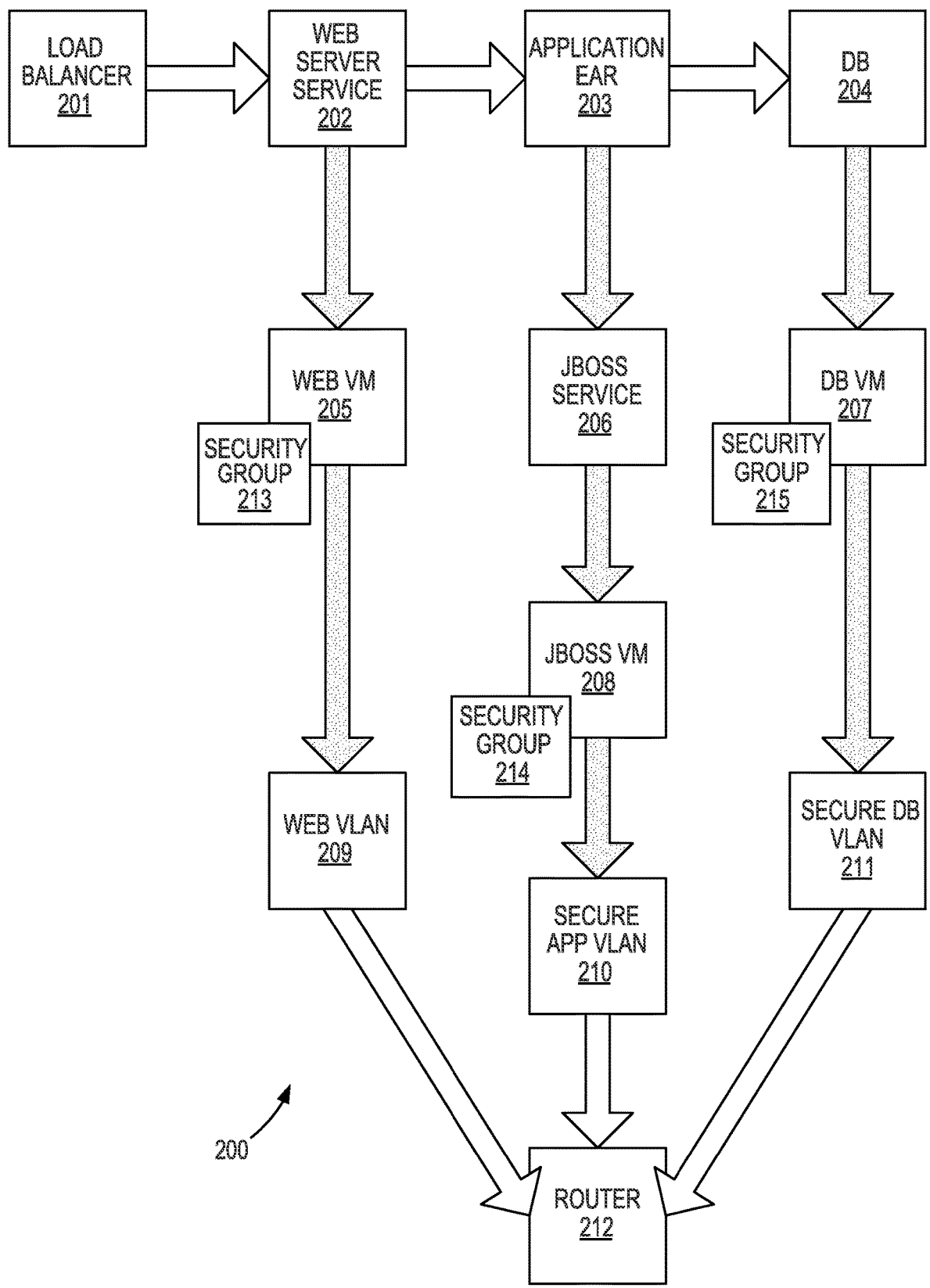
FIG. 2 is a block diagram showing an architecture derived topology, according to the present disclosure.

The present systems and methods describe architecture-descriptive topologies that define the physical architecture of a system that constitutes a cloud service. FIG. 2 is a block diagram showing an architecture derived topology (200), according to one example of the principles described herein. As depicted in FIG. 2, the architecture derived topology (200) may comprise a number of nodes (201, 202, 203, 204, 205, 206, 207, 208, 209, 210, 211, 212, 213, 214, 215) associated with one another. Associations between nodes within the topology (200) are indicated by the open arrows. A number of nodes (201, 202, 203, 204, 205, 206, 207, 208, 209, 210, 211, 212, 213, 214, 215) within the topology (200) may also be aggregated with one another as designated by the filled arrows. Aggregation is a computing term used to describe combining (aggregating) multiple network connections in parallel to increase throughput beyond what a single connection could sustain, and to provide redundancy in case one of the links fails.

For example, the load balancer (201), web server service (202), application enterprise archive (203), and the database (204) are associated with one another. The web server service (202) is aggregated with a web virtual machine (205) and its security group (213) as well as a web virtual local area network (209). Similarly, the application enterprise archive (203) is aggregated with an application server service such as the JavaBeans Open Source Software Application Server (JBoss) service (206), a JBoss virtual machine (208) and its associated security group (214), and a secure application virtual local area network (210). Again, similarly, the database (204) is associated with a database virtual machine (207) and its security group (215), and a secure database virtual local area network (211). The web virtual local area network (209), secure application virtual local area network (210), and secure database virtual local area network (211) are then associated with a router (212).

Thus, a cloud service based on an instantiation of the architecture derived topology (200) may be expressed as a topology of nodes with a number of relationships defined between a number of nodes within the topology. A number of properties and actions are associated with a number of the nodes, a number of groups of nodes, a portion of the topology, the topology as a whole, or combinations thereof. Further, a number of policies are associated with the number of the nodes, a number of groups of nodes, a portion of the topology, the topology as a whole, or combinations thereof. Still further, a number of lifecycle management actions (LCMAs) are associated with the number of the nodes, a number of groups of nodes, a portion of the topology, the topology as a whole, or combinations thereof.

Thus, the present systems and methods describe cloud service broker or manager that supports both topologies and blueprints while using the same lifecycle management engine. The lifecycle management engine supports lifecycle management of cloud services, and mapping of application models with infrastructure templates. The present systems and methods also describe a policy-based framework for managing the provisioning, deployment, monitoring, and remediation processes within a cloud service. Further, the present systems and methods provide support for usage models supported by CSA, CDA, and blueprints as will be described in more detail below.

As used in the present specification and in the appended claims, the terms "autonomous computing," "autonomic computing," is meant to be understood broadly as the self-managing characteristics of distributed computing resources that adapt to unpredictable changes while hiding intrinsic complexity to users and operators. Self-management may include self-configuration, self-optimization, self-monitoring, self-remediation, auto-provisioning, auto-remediation, or combinations thereof.

As used in the present specification and in the appended claims, the term "broker" is meant to be understood broadly as any computing device or a collection of computing devices in a network of computing devices that manages the designing, provisioning, deployment of a topology within the cloud, and the maintenance and life cycle management of (an) instantiated service based on that topology.

As used in the present specification and in the appended claims, the term "cloud service" is meant to be understood broadly as any number of services provided over a number of computing devices that are connected through a real-time communication network. Cloud services may include services provided on a distributed system implementing distributed hardware and software resources. In one example, a cloud service may be any service offered on a private cloud, public cloud, managed cloud, hybrid cloud, or combinations thereof. In another example, a cloud service may be services provided on physically independent machines such as, for example, a data center.

As used in the present specification and in the appended claims, the term "hybrid cloud" is meant to be understood broadly as multiple unique computing clouds that are bound together to provide a number of cloud services.

Further, as used in the present specification and in the appended claims, the terms "node or "computing device" are meant to be understood broadly as any hardware device, virtual device, group of hardware devices, group of virtual devices, or combination thereof within a network. Nodes may include, for example, servers, switches, data processing devices, data storage devices, load balancers, routers, and virtual embodiments thereof, among many other types of hardware and virtual devices. Further, nodes may be representations of the above hardware and virtual devices before execution and instantiation of a topology of which the node is a part.

Still further, as used in the present specification and in the appended claims, the term "topology" is meant to be understood broadly as data representing a graph of nodes where branches between the nodes represent relationships between the nodes. The nodes may comprise any number of computing devices located within a network. Thus, the topology of the network may comprise the physical and logical layout of networked computing devices, and definitions of the relationships between the computing devices. A number of policies and lifecycle management actions (LCMA) may be associated with the topologies, portions of the topologies, nodes within the topologies, groups of nodes within the topologies, and combinations thereof.

Still further, as used in the present specification and in the appended claims, the term "blueprint" is meant to be understood broadly as an execution flow for allowing automation of cloud service deployment and life cycle management of cloud services. A blue print may include a functional description of a number of hardware and/or virtualized components included within a service such as, for example, operating systems, application stacks, databases. A blueprint may further include a functional description of the configuration and connectivity between the hardware and virtualized components. The blueprints may also include a number of deployment models to enable the functional description to be deployed. The blueprints may further include a set of user-configurable options to allow a user to configure a number of optional aspects of the deployed service. Blueprints are an example of non architecture derived executable topologies.

Still further, in addition to the blueprints described above, the present disclosure provides for the utilization of executable topologies. Thus, the present systems and methods provide for the execution and instantiation of both blueprint- and architecture-derived topologies. Both blueprint- and architecture-derived topologies are executable. Thus, as used in the present specification and in the appended claims, the term "topology" is meant to be understood broadly as any set of executable logic or interpretable logic that may be expressed as executable logic that defines the characteristics of the network to be instantiated. The topology may define a number of nodes. Further, the topology may define and a number of policies and lifecycle management actions associated with the nodes as a number of groups, individually, or a combination thereof. In one example, blueprints may be expressed as topologies. In this example, the blueprint-derived topologies may also define a number of nodes and a number of policies and lifecycle management actions associated with the nodes within the topologies, groups of nodes within the topologies, portions of the topologies, the topology as a whole, and combinations thereof.

Still further, as used in the present specification and in the appended claims, the term "policy" is meant to be understood broadly as any data or metadata used to assist in the management of the provisioning, deploying, monitoring, enforcement, and remediation within a cloud service. The policies may represent a number of rules or sets of rules that are applicable to the provisioning, deploying, monitoring, enforcement, and remediation tasks associated with a number of computing devices within a cloud service environment.

Still further, as used in the present specification and in the appended claims, the term "user" is meant to be understood broadly as any individual or entity for whom or by whom a cloud service is designed, provisioned, deployed, monitored, policy enforced, incident remediated, otherwise managed, or combinations thereof. In one example, the user may purchase use of the cloud service at a cost. For example, the user may pay a subscription to use the cloud resources and services, and, in this case, also be classified as a subscriber. In another example, a user may be a designer or administrator of the cloud service. In still another example, a user may be any individual who manages the cloud service.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

The present systems may be utilized in any data processing scenario including, for example, within a network including the design, provisioning, deployment, and management of a number of computing devices within the network. For example, the present systems may be utilized in a cloud computing scenario where a number of computing devices, real or virtual, are designed, provisioned, deployed, and managed within a service-oriented network. In another example, the present systems may be utilized in a stand alone data center or a data center within a cloud computing scenario. The service oriented network may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of cloud services, or combinations thereof. The present systems may be implemented on one or multiple hardware platforms, in which the modules in the system are executed on one or across multiple platforms. Such modules may run on various forms of cloud technologies and hybrid cloud technologies or offered as a SaaS (Software as a service) that may be implemented on or off the cloud.

Further, the present systems may be used in a public cloud network, a private cloud network, a hybrid cloud network, other forms of networks, or combinations thereof. In one example, the methods provided by the present systems are provided as a service over a network by, for example, a third party. In another example, the methods provided by the present systems are executed by a local administrator. In still another example, the present systems may be utilized within a single computing device. In this data processing scenario, a single computing device may utilize the devices and associated methods described herein to deploy cloud services and manage life cycles of the cloud services. In the above examples, the design of the cloud service, provisioning of a number of computing devices and associated software within the cloud service, deployment of the designed and provisioned cloud resources and services, management of the cloud resources and services, and combinations thereof may be provided as the service.

Examples of the present disclosure may be embodied as a system, method, or computer program product, and may take the form of an entirely hardware embodiment, or an embodiment combining software and hardware examples that may all generally be referred to herein as a "circuit," "module" or "system." Furthermore, examples of the present disclosure may take the form of a computer program product embodied in a number of computer readable mediums comprising computer readable program code embodied thereon. Any combination of one or more computer readable mediums may be utilized.

A computer readable medium may be a computer readable storage medium in contrast to a computer readable signal medium. A computer readable storage medium may be, for example, an electronic, magnetic, optical, electromagnetic, infrared, or semiconductor system, apparatus, or device, or any suitable combination of the foregoing. More specific examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), a compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Throughout the present disclosure, various computing devices are described. The computing devices may comprise real or virtual computing elements including data processing devices, data storage devices, and data communication devices. Although these various devices may be described in connection with real and physical devices, any number of the devices may be virtual devices. The virtual devices, although describing a software-based computer that is based on specifications of emulated computer architecture and functions of a real world computer, the virtual devices comprise or are functionally connected to a number of associated hardware devices. Accordingly, aspects of the present disclosure may be implemented by hardware elements, software elements (including firmware, resident software, micro-code, etc.), or a combination of hardware and software elements.

In some examples, self-configuration may refer to the characteristic of an application to deploy itself and configure itself based on an indication or instruction to "deploy." For example, a topology may be associated with a number of policies that govern deployment and configuration. In another example, the topology may include provisioning logic that governs deployment and configuration of an application. Because the logic, policies, or combinations thereof are packaged with the topology, they can be self-deployed by a cloud management system. Such self-configuration may include executing a workflow where the actions call a number of application programming interfaces (APIs) of a cloud environment to provide a service. As used herein, a topology is a digital structure that includes information relating to a topology of an application and/or system that is implementing the application.

In some examples, an application may be auto-provisioned. For example, an application (which may include executables, a topology, and policies associated with the topology) may be selected to be instantiated as a service. As used herein, instantiating a service includes an implementation to improve an operation of a cloud system as described herein. The policies may include policies that describe monitoring, event handling, incident handling and remediation topologies. The policies may be passed to a platform such as the system described in connection with FIGS. 3 and 4 to be deployed. A provisioning policy may be an input to a provisioning policy engine that may evaluate provisioning policies including capabilities and requirements with context information and resource provider policies to determine which resource provider to use to perform LCMAs.

In another example, an application may be self-provisioned. In this example, APIs may be used, and built on the systems of FIGS. 3 and 4. The APIs pass executables, or installable artifacts, topologies, and policies to have the system provision and optimize the service.

Figure 3:
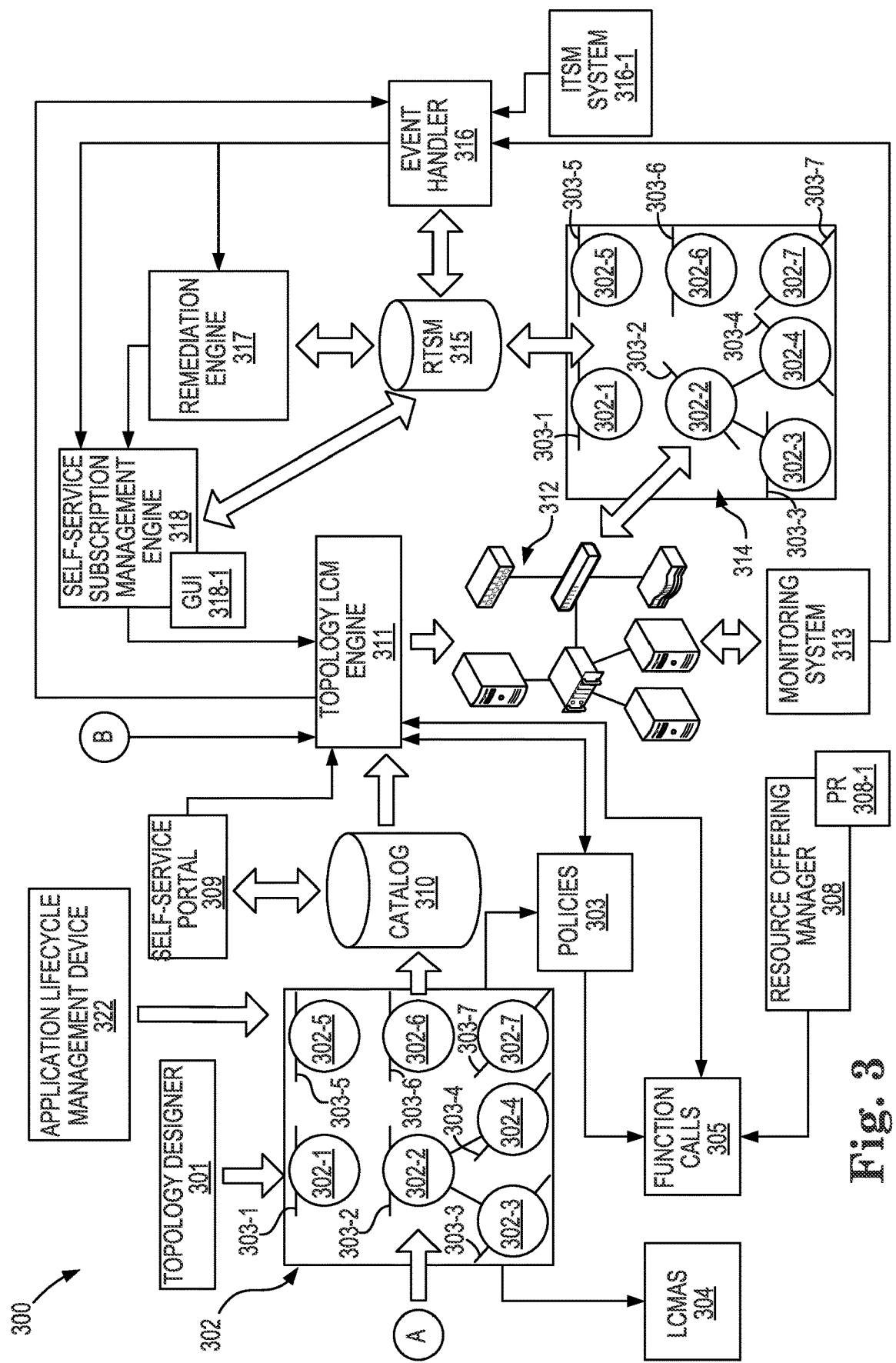
FIG. 3 depicts a block diagram showing a functional overview of a topology-based management broker for designing, provisioning, deploying, monitoring, and managing a cloud service, according to the present disclosure.
Figure 4:
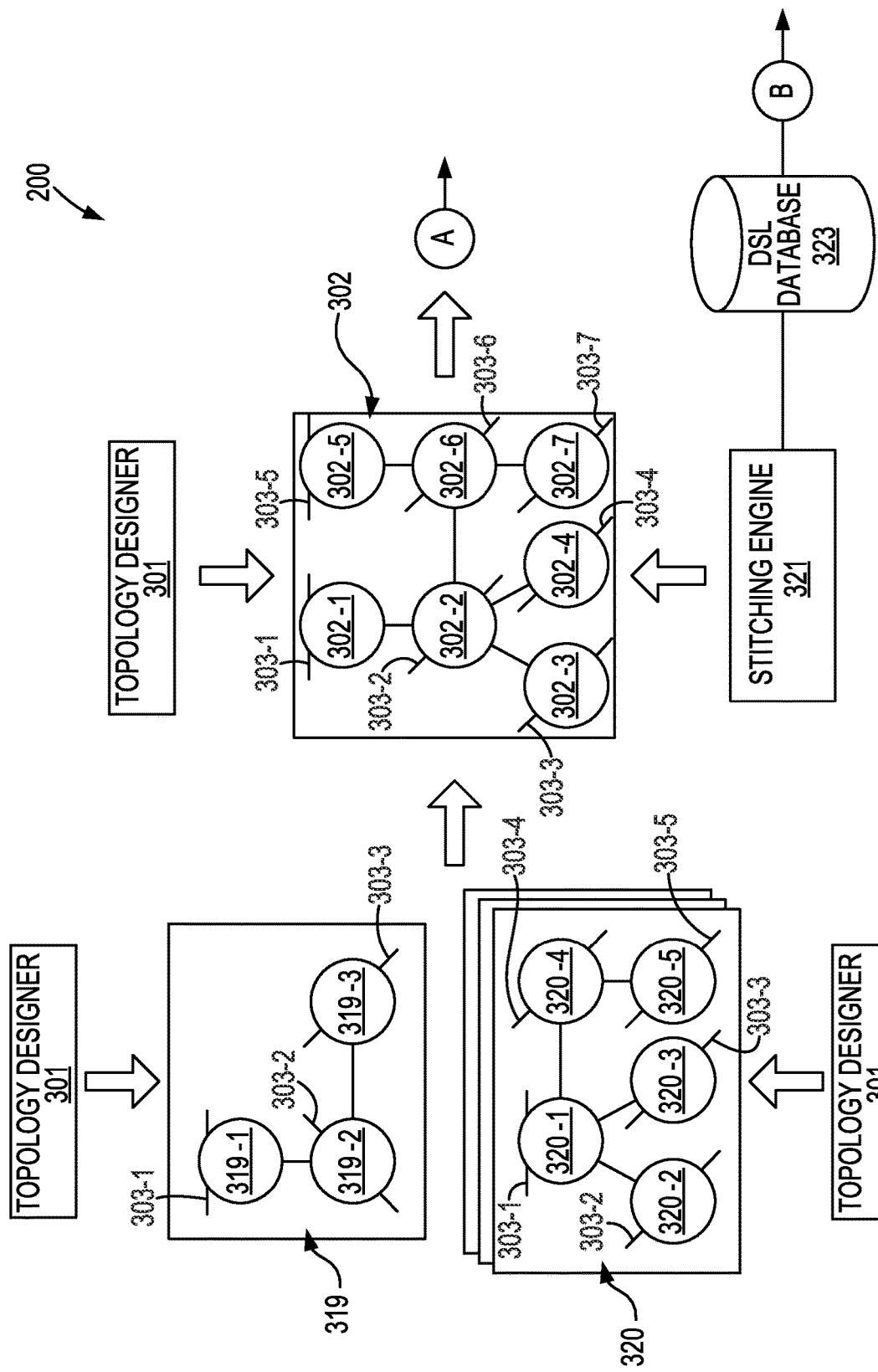
FIG. 4 depicts a block diagram showing a functional overview of a topology-based management broker for designing, provisioning, deploying, monitoring, and managing a cloud service, according to the present disclosure.

FIGS. 3 and 4 depict a block diagram of a topology-based management broker (300) along with a designing phase for provisioning, deploying, monitoring, protecting and remediating a cloud service, according to one example of the principles described herein. The system of FIGS. 3 and 4 support both topologies and blueprints while using the same lifecycle management engine as will be described in more detail below.

In one example, topologies (302) may be generated by designing a topology (302) de novo via a number of topology designers (301). In this example, a topology (302) may be designed to include a number of provisioning policies (303). The system (300) and the topology (302) may define a particular way to instantiate the service (312). Accordingly, the instantiated service (312) may be self-configuring during provisioning of the instantiated service (312).

In another example, the topology (302) may be generated by stitching a number of applications models (319) and a number of infrastructure templates (320) together using a number of stitching methods. In this example, the system (300) and the application models (319) with corresponding capability policies, requirements policies, and provisioning policies may self-select the best infrastructure template (320) for the topology (302). In this example, the topology (302) may be self-designing. The topology (302) may then self-configure, or define a particular way to instantiate the service (312) as described above.

In addition to being self-configuring, an application may be self-healing. Self-healing may refer to a service's (312) or an application's ability to monitor itself and self-remediate incidents generated based on collected data such as metrics. In some examples, self-healing may include monitoring and remediating in accordance with policies (303) included in a topology (302). In another example, self-healing may include executing remediation logic and monitoring logic included in the topology (302) itself.

Figure 5:
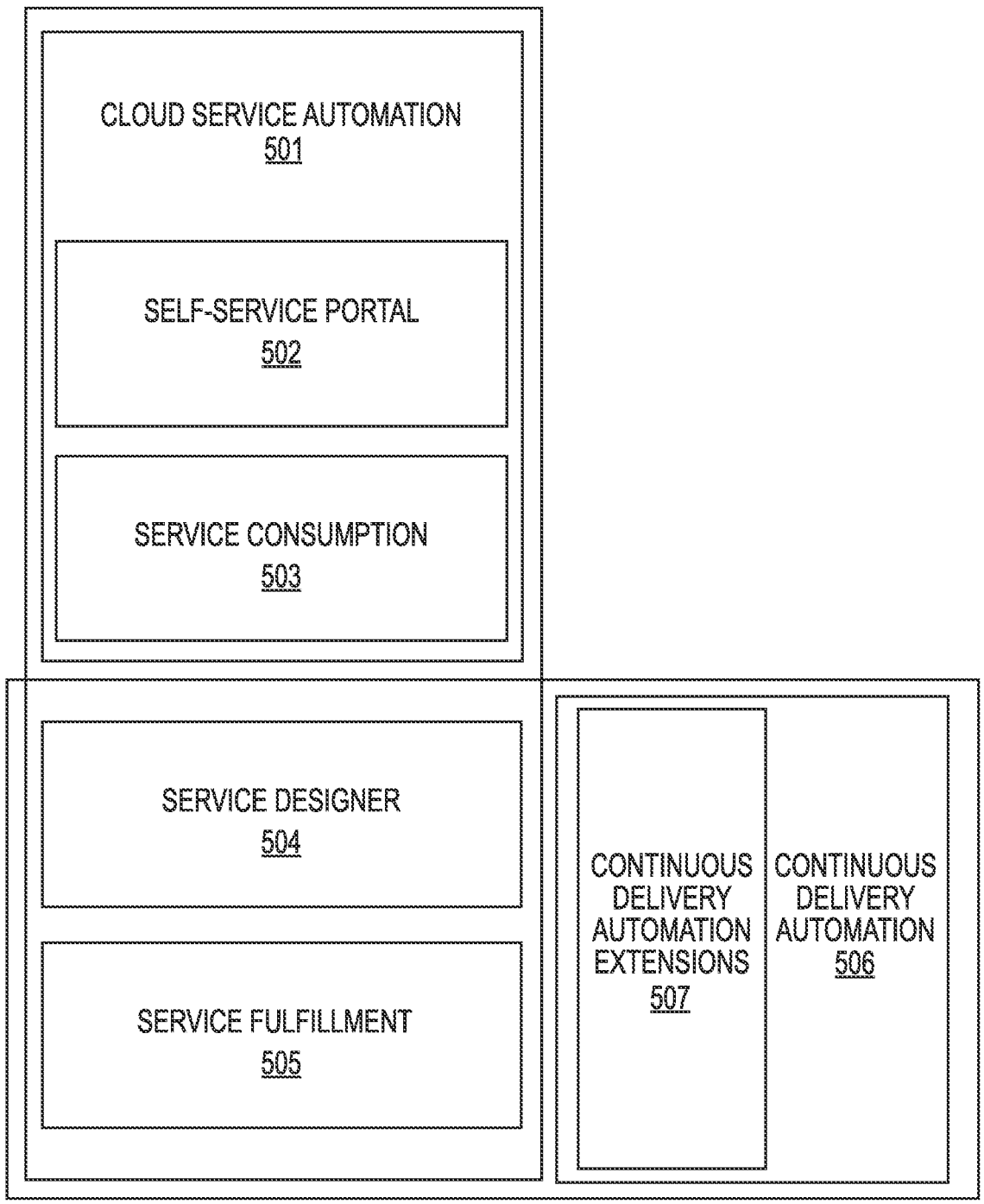
FIG. 5 depicts a block diagram showing a common platform for a topology-based management broker.

FIG. 5 is a block diagram showing a common platform (500) for topology-based management broker (300) of FIGS. 3 and 4 at a high level, according to one example of the principles described herein. As depicted in FIG. 5 a common platform for CSA (501) and CDA (506) are represented by the common use of service design aspects (504) and service fulfillment aspects (505). In the case of CSA (501), the self-service portal (502) and service consumption (503) aspects of CSA (501) use the same resources as does the CDA extension aspects (507) of CDA (506). In this manner, all use cases of instantiating a cloud service are supported by the common platform. Thus, although topologies may be designed de novo via a number of topology designers and/or via a application model and infrastructure template stitching process, the present systems and methods also provide, within the same system, execution of blueprints using the systems and methods described herein. This aspect will now be described in more detail in connection with FIGS. 3 and 4.

As depicted in FIGS. 3 and 4, one or a number of topology designers (301) contribute in designing various aspects of the cloud service topology. In one example, topology design is performed via a design tool that uses hardware devices and software modules such as graphical user interfaces (GUI) and coding scripts. A human designer designs the topology with the use of a design tool (301). Thus, the design of the topology (302) is achieved through a combination of autonomous and human-provided design methods. In one example, the topology designer (301) may be an interface utilizing API's that enables separate creation of an application model (FIG. 4, 319) and its associated components along with creation of an infrastructure template (FIG. 4, 320) which specifies infrastructure and lifecycle conditions for the infrastructure.

The subsystem depicted in FIG. 3 of the overall topology-based management broker (200) comprises a subsystem capable of provisioning, deploying, monitoring, enforcing policies within a cloud service, and remediating incidents within the cloud service. These tasks are all performed with the use of topologies with LCMAs and policies, whether the topologies are blueprint or architecture derived. Thus, the present systems and associated methods also support all the use cases that CSA 3.2 supports. As described above, CSA 3.2 is an automation system tool used to deploy and manage cloud computing applications, and is developed and distributed by Hewlett Packard Corporation. CSA 3.2 technologies are capable of supporting blueprints or architecture topologies. Further, CSA is described in International Patent App. Pub. No. PCT/US2012/045429, entitled "Managing a Hybrid Cloud Service," to Maes, which is hereby incorporated by reference in its entirety. As will be described in more detail below, the subsystem depicted in FIG. 3 uses a number of types of policies and lifecycle management actions (LCMAs) to provision, deploy, monitor, enforce policies within, and remediate incidents within a deployed cloud service.

Further, the subsystem depicted in FIG. 4 of the overall topology-based management broker (200) comprises a subsystem capable of independently modeling infrastructure and application requirements of a topology on the same stack as the subsystem depicted in FIG. 3. The present systems and associated methods also support all the use cases that a CDA subsystem such as those use cases of CDA 1.2 support. As described above, CDA is an automation system tool utilized within a topology designer that independently models infrastructure and application requirements while managing versions, configurations, and other application components. CDA 1.2 is also developed and distributed by Hewlett Packard Corporation. Further, CDA is described in International Patent App. Pub. No. PCT/US2012/041625, entitled "Cloud Application Deployment," to Maes, which is hereby incorporated by reference in its entirety.

In this manner, the subsystems of FIGS. 3 and 4 work under a common stack and work together within the topology-based management broker (200) as a single computing system with common use of topologies, realized topologies, and policies to support all use cases of constructing topologies and supporting multiple providers' associated technologies. Thus, in one example, the present systems and methods reconcile the differing models, templates, and blueprints used respectively by CDA and CSA by utilizing, on the same stack, designed topologies (preferably architecture derived) of a cloud service, a number of policies, and a number of LCMAs associated with the topology nodes/subsets/full.

As depicted in FIG. 3, a topology designer (301) may design and present a lifecycle management (LCM) topology (302) to the topology-based management broker (200). In one example, the topology designers (301) described herein may be an integrated part of the topology-based management broker (200). In another example, the topology designers (301) may be separate from the topology-based management broker (200). In another example, a number of persons may use the topology designers (301) to design the topologies (302). These individuals may be service designers, infrastructure architects or administrators, system administrators, information technology operators, offer managers, or users, among other personnel with roles in the design of a topology. In still another example, the topology designers (301) may be operated by a third party.

The LCM topology (302) may define a number of nodes (302-1, 302-2, 302-3, 302-4, 302-5, 302-6, 302-7), and a number of relationships between the nodes (302-1, 302-2, 302-3, 302-4, 302-5, 302-6, 302-7). Although in FIG. 3, seven nodes are depicted, any number of nodes may be designed into the topology (302) to achieve any data processing objectives. In one example, the topology-based management broker (200) may represent the topology (302) as an extensible markup language (XML) file. In another example, the topology-based management broker (200) may represent the topology (302) in JavaScript object notation (JSON) format: a text-based open standard designed for human-readable data interchange that is derived from the JavaScript scripting language for representing objects. In still another example, the topology-based management broker (200) may represent the topology (302) in YAML syntax format: a human-readable data serialization format.

In FIG. 3, the relationships between nodes (302-1, 302-2, 302-3, 302-4, 302-5, 302-6, 302-7) are depicted as lines connecting the nodes (302-1, 302-2, 302-3, 302-4, 302-5, 302-6, 302-7). Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are associated with a number of policies (303). Policies (303) are data or metadata provided in the same file describing the nodes or topology, or in a file associated therewith. In one example, the association of the policies (303) within the topology (302) may be performed during the designing of the topology (302), by, for example, an administrator when offering the design. In another example, the association of the policies (303) within the topology (302) may be performed during the designing of the topology (302) when a user, for example, selects the design as a subscription or request. In some embodiments, the policies 303 can be associated to each of the nodes (302-1, 302-2, 302-3, 302-4, 302-5, 302-6, 302-7). For example, policies (303-1, 303-2, 303-3, 303-4, 303-5, 303-6, 303-7) can be assigned to the corresponding nodes (302-1, 302-2, 302-3, 302-4, 302-5, 302-6, 302-7). As described further herein, the policies (303-1, 303-2, 303-3, 303-4, 303-5, 303-6, 303-7) can include a stage and version of an application, e.g., associated with an application and/or topology. In at least one example, the term "stage" as used herein is intended to mean a test, pre-production, and production stage of an application's development and/or deployment. In some embodiments, the topology (302) can be a realized topology. A realized topology can be a topology (302) that was generated by an entity that is also utilizing the topology (302).

Policies (303) are data or metadata provided in the same file describing the nodes or topology, or in a file associated therewith. In one example, the association of the policies (303) within the topology (302) may be performed during the designing of the topology (302), by, for example, an administrator when offering the design. In another example, the association of the policies (303) within the topology (302) may be performed during the designing of the topology (302) when a user, for example, selects the design as a subscription or request.

In some embodiments, the policies (303) can be associated to each of the nodes (302-1, 302-2, 302-3, 302-4, 302-5, 302-6, 302-7). In some embodiments, the policies (303) can be associated to each of a number of application models (319) as referenced in FIG. 4. Furthermore, in some embodiments, the policies (303) can be associated to each of a number of infrastructure templates (320) as referenced in FIG. 4. For example, policies (303-1, 303-2, 303-3, 303-4, 303-5, 303-6, 303-7) can be assigned to the corresponding nodes (302-1, 302-2, 302-3, 302-4, 302-5, 302-6, 302-7). As described further herein, the policies (303-1, 303-2, 303-3, 303-4, 303-5, 303-6, 303-7) can include a stage and version of an application.

As described further herein, notification policies can be utilized to notify a manager and/or developer of the topology and/or system. In some embodiments, the notifications can be designated to be sent to a particular user and/or system based on an incident type as described in more detail below.

Further, in one example, the addition of a policy (303) to the topology or portions thereof may cause the design of the topology to change. In this example, a policy (303) added to an element of the topology (302) may effect a number of other policies. For example, associating with a topology (302) a policy that indicates that a node be highly available may evolve the policies (303) and topology (302) as a whole to require, for example, a cluster of nodes. In this manner, policies may drive the design of the topology (302).

Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are further associated with a number of lifecycle management actions (LCMAs) (304). In examples where LCMAs (304) are associated with the nodes, a single LCMA is associated with a given node. In examples where a number of LCMAs are associated with portions of the topology (302) or the topology (302) as a whole, the LCMAs are subjected to an orchestration of resource providers.

LCMAs are expressed as a number of application programming interfaces (APIs), wherein the LCMAs are called during execution of the topology (302), and a number of computing resources are provisioned for purposes of managing the lifecycle of a given cloud capability. In one example, the LCMAs may be accessed via uniform resource identifiers (URIs) of application programming interfaces (APIs) to perform calls in order to execute the APIs. In one example, the LCMAs are provided by reference within the file comprising the data or metadata described above in connection with the policies (303).

In one example, the LCMAs are associated with the aspects of the topology by default by virtue of what computing device the node or nodes (302-1, 302-2, 302-3, 302-4, 302-5, 302-6, 302-7) represent. In another example, the LCMAs are associated with the aspects of the topology by explicitly providing a number of functions, $F_{Action}$, that define how to select a resource provider to implement the action based on the policies associated with the aspects of the topology and the policies of the different relevant resource providers. These functions define how a resource provider is selected to implement the action based on the policies associated with the aspect of the topology and the policies of the different relevant resource providers.

The policies and LCMAs will be denoted herein by elements 303 and 304, respectively, to denote that the policies (303) and LCMAs (304) are associated with the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof. In one example, the association of the policies and LCMAs with aspects of the topology is performed via the topology designer (301).

In one example, although not depicted, a subset of nodes making up a group may also be associated with a number of policies (303) and a number of LCMAs (304). In this example, a number of nodes, for example, nodes (302-2, 302-3, 302-4, 302-6, 302-7), may be associated as a group with a number of policies (303) and a number of LCMAs (304) associated therewith. Several groupings of the nodes may be present within the entire topology (302). In one example, the groups of nodes may overlap, in which a single node in a first group of nodes may also belong to a second group of nodes, and be subjected to both the first and second groups of nodes' policies (303) and LCMAs (304). Policies and their associations with individual nodes and groups of nodes will be described in more detail below.

The policies (303) associated with the nodes may be expressed and attached with the nodes in any manner (302-1, 302-2, 302-3, 302-4, 302-5, 302-6, 302-7). In one example, the policies (303) are associated with the nodes (302-1, 302-2, 302-3, 302-4, 302-5, 302-6, 302-7) by defining properties of the nodes (302-1, 302-2, 302-3, 302-4, 302-5, 302-6, 302-7). In another example, the policies (303) are associated with the nodes (302-1, 302-2, 302-3, 302-4, 302-5, 302-6, 302-7) by metalanguage expressions.

The policies (303) are a number of descriptions, metadata, workflows, scripts, rules, or sets of rules that are applicable to guiding the provisioning, monitoring, enforcement, governance, and remediation tasks associated with the lifecycle management of a number of nodes (302-1, 302-2, 302-3, 302-4, 302-5, 302-6, 302-7) within a cloud service environment in which the topology (302) is to be or has been implemented. The policies (303) define the access control and usage control of the APIs of the topology-based management broker (200). Further, policies (303) define the access control and usage control of the APIs used to manage or use the instantiated services. For example, when a security threat is detected by a monitoring system (313), a remediation option may comprise making changes to a number of access control policies.

The policies (303) may be associated with and operable against a number of individual nodes, a number of groups of nodes, a number of nodes of a class of nodes, a subset of the nodes within the entire topology of the cloud service; the entire topology of the cloud service as a whole, or combinations thereof. If the policies (303) are initiated on the individual nodes, groups of nodes, or the entire topology of the cloud service as a whole, the policies will guide how life cycle management actions are taken with respect to, or performed on the individual nodes, groups of nodes, nodes of a class of nodes, a subset of the nodes within the entire topology of the cloud service, or the entire topology of the cloud service as a whole.

One example of a type of policy is a provisioning policy that includes a stage and version of an application and/or node within the topology. Provisioning policies may, if implemented, define the characteristics of the test, pre-production, and/or production of the application that comprises the cloud associated with the topology when the topology is provisioned, deployed, and executed. This provisioning can include the infrastructure and platform of the topology (302). The provisioning policies may include definitions of characteristics such as, for example, the physical location of a node. Provisioning policies may also include definitions of characteristics such as, for example, a geographical or deployment type location such as a network zone with or without access to an internet or behind or not behind a firewall, among other geographical or deployment type provisioning policies. In this example, a policy may have a provisioning policy component that may be associated with a server device that requires the server device to be located in a particular geographic area of a country, a particular region such as, for example, the east coast of the United States versus the west coast, a particular server facility, or any other geographic location.

The stage and version policies can include definitions and/or guides that are specific to a particular stage and/or version (e.g., stage and version policies, etc.). For example, a first policy can include definitions and/or guides that correspond to a first version of an application and a second policy can include definitions and/or guides that correspond to a second version of the application. In this example, the first version of the application can be an earlier version of the application and the second version of the application can be a later developed (e.g., more advanced version) of the same application. The definitions and/or guides can include information such as what infrastructure or locations are available for a corresponding stage. In addition, the definitions and/or guides can include information such as what topology layers are available for the corresponding stage. For example, the information can include what layers satisfy the topology of the applications and/or which layers can be utilized by the corresponding version of the applications.

In some embodiments, the design of the topology (302) and/or the stage and version policies (303) can be written in code (e.g., YAML, TOSCA YAMAL Profile). This can be different from previous methods and systems in that some previous methods and systems utilize a designer to design the topology (302) and to design the policies (303).

In some embodiments, the information relating to staging or versioning (e.g., information within the stage and version policies, etc.) can be passed and/or pointed at with a request to provision and/or manage an application based on the topology (302) and the policies (303). In some embodiments, the requests to provision and/or manage can be from a development tool chain. For example, the requests to provision and/or manage can be triggered from different flows involved in the development of the application (e.g., IDE, tools that include an eclipse plug-in, after testing has been passed, etc.). These embodiments can be advantageous over previous methods and systems since the embodiments that include requests to provision and/or manage can be part of a continuous integration (CI) and/or continuous delivery (CD) chain.

The stage and version policies (303) can also include information that can be utilized to point to a DSL and/or repository of artefacts that can be used to deploy instances. In some embodiments, the LCM of the realized topology can be made available to the developer for management of the realized topology via code (e.g., calling in code for the APIs, etc.). In certain embodiments, the stage and version policies (303) can be utilized to determine how other polices (303) or management plans are executed. For example, a determination can be made to monitor different aspects of the application at different stages and/or versions of the application. For example, at a first stage of the application the stage and version policies (303) can include information to monitor full operations and usage of the application. In this example, at a second stage of the application the stage and version policies (303) can include information to stop monitoring the full operations and usage of the application.

As to a provisioning policy that defines a physical location of the computing device (e.g., storage, networking, etc.), other characteristics may include, for example, the level of security of the location or access to the internet at which the node is located. Other provisioning policies may also include, for example, the speed in, for example, bandwidth of the network to which the node is coupled, whether the node is to be connected to an internet or intranet such as, for example, a demilitarized zone (DMZ) or perimeter network, whether the node is firewalled, whether the node has access to an internet, whether the node is to be located on top of another node, and whether the node is to be located on top of another node using a particular infrastructure element or platform, among other provisioning policies.

Provisioning policies may also, if implemented, rely on the requirements and capabilities of the nodes within the proposed cloud service that is based on the topology (302). Requirements define the needs of nodes (302-1, 302-2, 302-3, 302-4, 302-5, 302-6, 302-7) such as, for example, server or network needs in relation to processing, memory, and operating system (OS) needs, among other forms of needs. For example, the requirements policies may indicate that a node requires particular software or a particular software version associated with it such as a particular operating system. As another example, a requirements policy may also indicate that a particular node may require additional hardware devices associated with it such as, for example, a server device, a server group, or a high availability configuration, among others.

Capabilities such as the nature of the processors, memory, capacity, OS, middleware type and version, among others, define what each node (302-1, 302-2, 302-3, 302-4, 302-5, 302-6, 302-7) offers. Thus, in one example, capabilities policies may indicate that a node is capable of processing data at a certain rate. In another example, a capabilities policy may indicate that a memory device may have a terabyte (TB) of data storage space.

In still another example, the requirements policies may indicate that a node requires a particular computing platform. When designing a topology (302), the topology or association of metadata supports capturing data defining a number of hardware devices within the computing platform including hardware architecture and a software framework (including application frameworks). When the metadata is presented or associated, it is used to guide provisioning policies in order to better select appropriate elements within the computing platform such as, for example, a suitable data center. The metadata, when presented or associated, may also be used to guide matching fragments of topologies to other fragments as will be discussed in more detail below in connection with stitching of application models to infrastructure templates.

With regard to capability policies, the nodes may define what kind of device they are, what versions of software they capable of, or are executing, and what they can do. An example, of a capability policy may include a definition associated with the node that defines it as an application server, that it provides a Java Platform, Enterprise Edition (J2EE) environment, that it runs a particular operating system, a version of an operating system, or a particular release of a version of the operating system, among many other capabilities. As described above, this may be used to determine, for example, what else may be deployed or what other devices may use the cloud services.

Another type of policy (303) that may be assigned includes monitoring policies. Monitoring policies are policies that, if implemented, define the operational monitoring of the nodes (302-1, 302-2, 302-3, 302-4, 302-5, 302-6, 302-7), the security monitoring of the nodes, the stage and version monitoring of the nodes, analytics among the nodes and groups of nodes, usage monitoring of the nodes, performance monitoring, and intelligence monitoring such as, for example, collection of metrics, business intelligence (BI) and business activity monitoring (BAM) and analytics/big data integration, among other types monitoring-related policies.

The monitoring policies may also define what kind of monitoring is expected and how the monitoring is to be implemented. Examples of monitoring policies regarding node operations include performance, monitoring CPU levels and loads of the various nodes within the network, monitoring the speed at which data is processed through a node or a number of nodes or exchanged between nodes, and monitoring the operational state of applications running on a node or nodes at any level of the network, among many other operations parameters of the nodes, group of nodes, and the cloud service as a whole.

In another example, the monitoring policies also define how monitored events that occur in an instantiated topology are handled. In this example, the monitoring policies assist an event handler (316) in receiving and processing the events, and in making decisions regarding remediation of incidents resulting from the events, and in sending notification messages regarding the incidents. The handling of events within the topology-based management broker (200) will be described in more detail below. As will be described in more detail below, the monitoring policies include a portion that defines what to do with the monitored events that result from the monitoring such as, for example, how to handled the events, where the events are sent, what devices or individuals address the events, how incidents resulting from the processing of the events are handled, how the events and incidents are processed (e.g., processed as aggregated, filtered, or correlated events, among other forms of processing), and how the resulting incidents are handled.

Monitoring policies also include monitoring policies regarding security. Security policies define how to monitor for abnormal behaviors or behaviors known as being associated with known or suspected security issues. Examples of monitoring policies regarding security include monitoring whether a node or a group of nodes is experiencing an attack, whether there is strange behavior occurring within the cloud service or interactions with the cloud service, and whether there is a virus or other anomaly with a node or group of nodes, among other security-related monitoring policies.

Monitoring policies also include monitoring policies regarding usage. Examples of monitoring policies regarding usage include, determining how much a user has been using CPUs of a node or group of nodes, determining how much memory a user has utilized, determining how much money has been charged to the user, and determining whether the user has paid for the services provide through the designing, provisioning, deploying, and monitoring of the network topology, among other usage-related monitoring policies.

The policies (303) may further comprise governance policies that, if implemented, define access controls of nodes (302-1, 302-2, 302-3, 302-4, 302-5, 302-6, 302-7) or groups of nodes within the topology (302) or the cloud service. For example, governance policies may include policies that define who may access the nodes within the topology (302) or the cloud service, and under what conditions may those individuals obtain such access.

The policies (303) may further comprise analytics policies that, if implemented, define what is needed to ensure analytics and big data monitoring within or among the nodes (302-1, 302-2, 302-3, 302-4, 302-5, 302-6, 302-7) or groups of nodes within the topology (302), and ensure that this is occurring as expected. For example, the analytics policies may define a number of workflows by which the monitoring system (313) may operate to configure the cloud service, provide analytics, collect big data, and process the data.

Still further, the policies (303) may comprise remediation policies that define what actions are to take place within the topology (302) should a problem arise or an incident be raised during deployment and execution of the topology (302). Remediation policies may include policies that define a number of actions taken by the topology-based management broker (200) during remediation processes, and include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; (7) proposing a remediation action to a user or administrator for approval, and performing the proposed remediation action if approved by the user or administrator, or combinations thereof.

As an example, a failure of the cloud service as instantiated or realized by the topology (302) may occur, and the remediation policies may define how that failure may be handled based on the above potential scenarios. In addition, the remediation policies provide the actual rules and workflows of actions to perform to remediate the incidents under any number of conditions or indicate to whom or which device to delegate the decision making and orchestration and fulfillment of these remediation actions. Another remediation example may regard a potential need to maintain a level of service based on, for example, a service level agreement (SLA), or a quality of service (QoS) within the cloud service that is realized based on the topology (302). In this example, the addition of resources to support the increase in demand for resources may be handled based on the above potential scenarios. More details regarding monitoring of the deployed topology and event handling therein will be described in more detail below.

As described above, the nodes (302-1, 302-2, 302-3, 302-4, 302-5, 302-6, 302-7) may include a number of lifecycle management actions (LCMA) (304) associated with the nodes (302-1, 302-2, 302-3, 302-4, 302-5, 302-6, 302-7). The LCMAs (304) are a number of actions associated with the policies (303) that are executed by a processor when triggered by the policies (303) within a cloud service environment in which the topology (302) is implemented. The LCMAs may be associated with and operable against a number of individual nodes, a number of groups of nodes, a number of nodes of a class of nodes, a subset of the nodes within the entire topology of the cloud service; the entire topology of the cloud service as a whole, or combinations thereof. If the LCMAs are executed with respect to the individual nodes, groups of nodes, or the entire topology of the cloud services as a whole, the LCMAs will take an action with respect to the individual nodes, groups of nodes, the nodes of a class of nodes, a subset of the nodes within the entire topology of the cloud service, or the entire topology of the cloud service as a whole as defined within the LCMAs. LCMAs (304) include actions such as, for example, provisioning of computing resources within the topology, updating the topology, copying all or portions of the topology, modifying computing resources within the topology, moving computing resources within the topology, destroying or deleting resources within the topology, among other lifecycle management actions.

The various policies described herein define what actions are to be performed throughout the lifecycle of the topology (302) before, during, and after instantiation of a service based on the topology (302). Further, the various policies described herein define how these actions are to be performed. Still further, the various policies described herein define which device, individual, or combination thereof to which the actions are to be delegated. Even still further, the various policies described herein define combinations of the above. For example, any of the monitoring policies used in event handling and processing, or remediation may define what devices or portions of the cloud service are to be monitored or remediated, how to execute such monitoring and remediation, to whom or what devices to delegate the roles of monitoring and remediation, or a combination thereof.

Figure 6:
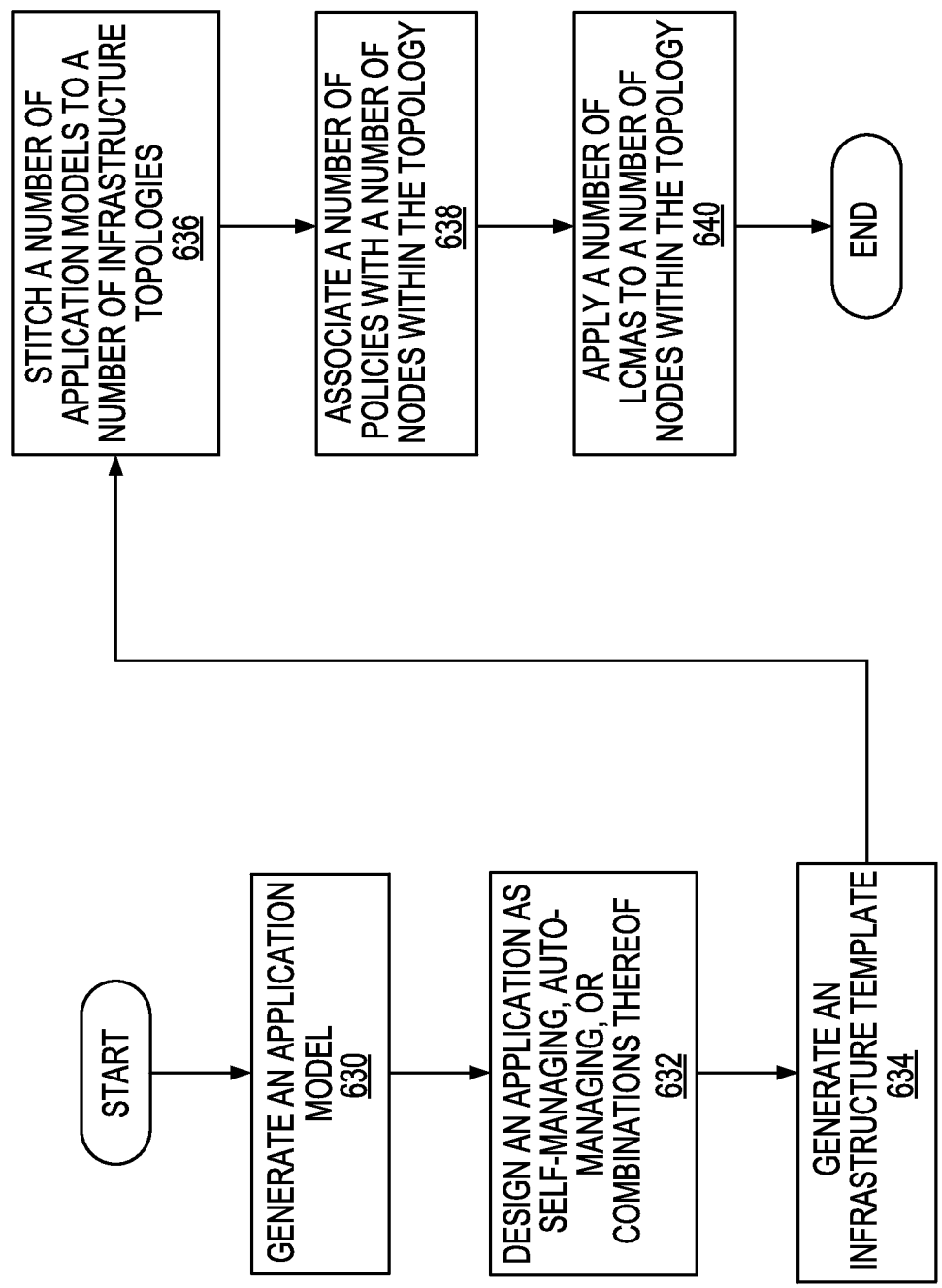
FIG. 6 is a flowchart showing a method of designing a topology, according to the present disclosure.

FIG. 6 is a flowchart showing a method of designing a topology, according to one example of the principles described herein. The method of FIG. 6 may begin by generating (block 630) an application model (FIG. 4, 319). In one example, a topology designer (301) may be used to design and create the application model (FIG. 4, 319), and, in this manner, generate an application model (FIG. 4, 319). In another example, the application model (FIG. 4, 319) may be obtained from a number of application model (FIG. 4, 319) sources such as, for example, the catalog (FIG. 3, 310), the RTSM (FIG. 3, 315), or the DSL database (FIG. 4, 323), among other application model (FIG. 4, 319) sources. The application model (FIG. 4, 319) is defined by a lifecycle management topology. As described herein in connection with the LCM topology (FIG. 3, 302), the application model (FIG. 4, 319) comprises a number of nodes (FIG. 4, 319-1, 319-2, 319-3).

Generating (block 630) an application model may include designing (block 532) an application as self-managing, auto-managing, or combinations thereof. A number of infrastructure templates (FIG. 4, 320) may also be generated (block 534). In one example, a topology designer (301) may be used to design and create the infrastructure template (FIG. 4, 320). In another example, the infrastructure template (FIG. 4, 320) may be obtained from a number of infrastructure template (FIG. 4, 320) sources such as, for example, the catalog (FIG. 3, 310), the RTSM (FIG. 3, 315), or the DSL database (FIG. 4, 323), among other infrastructure template (FIG. 4, 320) sources. The infrastructure template (FIG. 4, 320) is defined by a lifecycle management topology. As described herein in connection with the LCM topology (FIG. 3, 302), the infrastructure template (FIG. 4, 320) comprises a number of nodes (FIG. 4, 319-1, 319-2, 319-3). In one example, a number of persons may use the topology designers (301) to design the application models (FIG. 4, 319) and infrastructure templates (FIG. 4, 320). These individuals may be service designers, infrastructure architects or administrators, system administrators, information technology operators, offer managers, or users, among other personnel with roles in the design of a topology.

A number of application models (FIG. 4, 319) are stitched (block 903) to a number of infrastructure templates (FIG. 4, 320). In one example, the stitching engine (FIG. 4, 321) may obtain a number of infrastructure topologies (FIG. 4, 320) stored in, for example, the DSL database (FIG. 4, 323) or other source of infrastructure templates (320), and stitch a number of application models (FIG. 4, 319) to a number of appropriate infrastructure templates (FIG. 4, 320). In another example, the infrastructure templates (FIG. 4, 320) may be designed de novo by a number of topology designers (301).

The stitching engine (FIG. 4, 321) may use any type of method to stitch the application models (FIG. 4, 319) to the infrastructure templates (FIG. 4, 320) based on the policies and LCMA associated with the application models (FIG. 4, 319) to the infrastructure templates (FIG. 4, 320). In one example, the stitching engine (FIG. 4, 321) may use a matching process in which the stitching engine (FIG. 4, 321) matches the policies, requirements, and capabilities associated with the nodes (FIG. 4, 319-1, 319-2, 319-3) of the application models (FIG. 4, 319) with the policies, requirements, and capabilities of the nodes (FIG. 4, 320-1, 320-2, 320-3, 320-4, 320-5) of the infrastructure templates (FIG. 4, 320). In this example, the stitching engine (FIG. 4, 321) may browse through the template sources described herein to find a match or near match. Once a match is found, the stitching engine (FIG. 4, 321) matches a number of nodes (FIG. 4, 319-1, 319-2, 319-3) of the application models (319) with a number of the nodes (FIG. 4, 320-1, 320-2, 320-3, 320-4, 320-5) of the matching infrastructure templates (FIG. 4, 320).

Another method the stitching engine (FIG. 4, 321) may use to stitch the application models (FIG. 4, 319) to the infrastructure templates (FIG. 4, 320) may comprise an algorithmic matching method. In this method, the stitching engine (FIG. 4, 321) determines mathematically via algorithms that employ the policies in performing the matching decisions. In one example, this may include inference methods in which requirements in the application level are tagged or otherwise associated with components that support them in the DSL database (FIG. 4, 323), wherein the overall infrastructure topology (FIG. 4, 320) is aggregated first before the aggregation is extended to the application models (FIG. 4, 319).

A number of policies and lifecycle management actions (LCMAs) are associated with each of the nodes (FIG. 4, 319-1, 319-2, 319-3) of the application model (FIG. 4, 319) and nodes of the infrastructure topology (FIG. 4, 320). In one example, the association of the number of policies (303) and LCMAs (304) with the nodes (319-1, 319-2, 319-3, 320-1, 320-2, 320-3, 320-4, 320-5) of the application model (319) and infrastructure topology (320) may be performed by the topology designers (301), self-service portal (309), and resource offering manager (308), alone or in combination. In another example, a separate policy engine and LCMA engine may be provided to associate the nodes (319-1, 319-2, 319-3, 320-1, 320-2, 320-3, 320-4, 320-5) of the application model (319) and infrastructure topology (320) with the policies (303) and LCMAs (304) as described herein.

In one example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be performed before, during, or after the stitching process described in connection with block 636. In one example where policies and LCMAs are associated before the stitching process of block 634, the policies (303) and LCMAs (304) may be associated with a number of nodes or groups of nodes within the application model (319) and infrastructure topology (320), as well as with the application model (319) as a whole and infrastructure topology (320) as a whole. In this example, additional policies (303) and LCMAs (304) may be associated with the topology (302) created via the stitching process. In another example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be optional as to performance of these processes after the stitching process of block 634. In still another example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be performed before and after stitching process of block 534.

The processes described in FIG. 6 results in a completely designed topology (302) similar to the topology (302) described herein in connection with FIG. 3. For example, the topology (FIG. 4, 302) resulting from the method of FIG. 6 may be used as the input topology (FIG. 3, 302). Further, in another example, the topology (FIG. 4, 302) resulting from the method of FIG. 6 may be used as the input topology (FIG. 3, 302) for instantiation in the remediation. Further still, in one example, a number of persons participate in the method described in FIG. 6. These individuals may be service designers, infrastructure architects or administrators, system administrators, information technology operators, offer managers, or users, among other personnel with roles in the design, execution, monitoring, and remediation of a topology (302).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the a number of processors within the devices comprising the topology-based management broker (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe methods and systems of managing the lifecycle of cloud service modeled as a topology. These systems and methods include, with a processor, generating a topology, the topology representing a cloud service, associating a number of lifecycle management actions (LCMAs) with a number of nodes within the topology, and with a lifecycle management engine, executing the topology.

This management of the lifecycle of a cloud service modeled as a topology may have a number of advantages, including: (1) providing a common stack along with common use of topologies, realized topologies, and policies may be used to support all use cases for both cloud service automation (CSA) and continued delivery automation (CDA) platforms and services to construct topologies while utilizing the same technology and supporting multiple providers' associated technologies; (2) providing a computing environment in which CSA and CDA use the same topology representations such as, for example, extensible mark-up language (XML) or JavaScript object mutation (JSON); (3) providing a method of managing migration of content for CSA by reusing existing CSA content, creating a path to migrate resource providers, and reusing providers; (4) avoiding or alleviating the risk of perpetuating a CSA/CDA confusion, duplication of efforts and endangering future CSA opportunities; (5) complex applications may be automatically deployed on requested infrastructure without also requiring users to understand how to perform such operations, (6) supports a CM&S environment, and (7) provides for automatic computing, workload management, and policy-based auto-remediation and self-remediation within a cloud environment among many other advantages.

Figure 7:
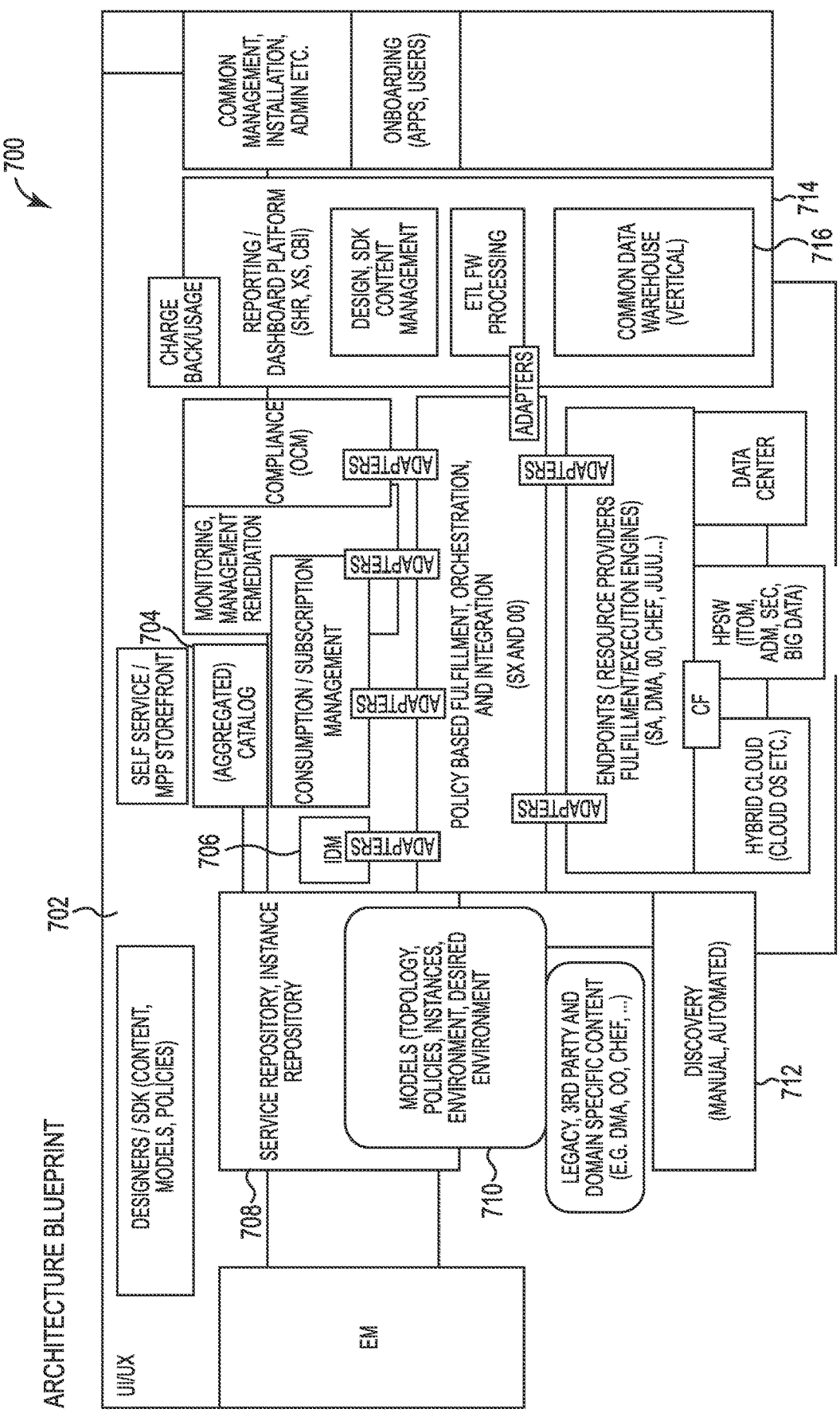
FIG. 7 is an example of a system, according to the present disclosure.

FIG. 7 is an example of a system (700), according to the present disclosure. FIG. 7 includes second day operations without first day operations. For example, FIG. 7 includes decoupling the realized topology from the way that the topology was previously provisioned and/or modified. The system (700) is a system where realized topologies can not only be known because they have been provisioned and managed by the system (600) but they can also be a discovered realized topology and/or an inferred realized topology, as described herein. The system (700) can include various elements to provision and manage a cloud system.

Discovered topologies refer to an ability to obtain information relating to the topology from a different system other than system (700) (i.e., topologies that have not been provisioned or that may have been managed and modified separately from the main system (700)).

For example, the topology can be from another cloud controller or system that provisioned the topology (e.g. a VMWare controller like vCenter, a legacy provisioner like SA, a system disconnected from the system (700), etc.). In another example, the topology can be inferred from repositories where the information has been stored by whoever or whatever system designed and/or defined the topology (e.g. HP Enterprise Map—EM), provisioned (e.g., HP UCMDB) and/or managed/modified the topology or modified the instance provisioned from the system.

For example, the inferred topology can be designs and/or specs from SA (Server Automation) or information stored in a CMDB. In inferred cases, the information from the repository can be loaded into the system (700) and mapped to a topology with policies (e.g., with the life cycle management action associated to the different elements and associated policies (e.g., inferred also or resulting from the policies associated in a certain context/data for the node type)). The inferred topology and/or the associated policies may be a best guess in some embodiments. The inferred topology can expose what is known (e.g., what can be used by the system (700) in terms of policies or LCM to further manage). Missing topology information and/or corrections to the inferred topologies (e.g. LCM details, dependencies/relationships, policies can then be updated manually using a console similar to a topology designer).

The system (700) can be important when the realized topologies are not the result of provisioning, management (e.g., management other than remediation) or remediation done by the system (700), but also when other systems act on the management of the realized topologies. For example, additional systems can be independent monitoring, managing, or remediating the realized topologies (e.g., system 700 is HP CSA based). In some embodiments, the CSA policies can include sharing the realize topology instances in CMDB. In another example, system like HP SA (Server Automation) can use the stored information to perform monitoring (e.g., operation, usage security), management, and/or remediation. In some embodiments, the monitoring, management, and/or remediation can be done in parallel that is not related to system (700). In some embodiments, the topology may need to be rediscovered or inferred, as described herein, or simply because system (700) is informed to import the info back to system (700) or notified of the change. The discovery system therefore can track changes or notifications to instances and also reflect these in updates to the instances that it stores and tracks. That is, after provisioning some steps can be performed by external systems (e.g., systems other than system (700)). As a result, in order to maintain the ability of system (700) it can be important that the updates to the instances be also reflected into the system (700). Thus, the system (700) can rediscover the changes to the instances or the system (700) can be informed of the changes (i.e., notifications).

In some embodiments, the applications are deployed in a platform that takes over some or all of the management steps of the realized topology. For example, the application is deployed in a PaaS like Cloud Foundry, or other execution and management platform, where while system (700) can be used to deploy the application and/or the PaaS as well as its context (e.g. PaaS deployment on infrastructure and manifest generation and code deployment in PaaS). Then the PaaS can manage the realized topology (e.g. auto-scaling). When this happens, the system (700) may not be performing the changes to the realized topology. To continue to be relevant to manage the realized topology, the current solution described herein is needed (e.g., updates to the realized topology are tracked by or notified to system (700) by tracking them as updates to the realized topology imported (or synched) from cloud foundry).

The system (700) can include a user interface (702). The user interface (702) can be utilized to display information relating to the cloud system. In some embodiments, the user interface (702) can be utilized to input data relating to the cloud system. The system (700) can be utilized to visualize the inferred realized topologies as described herein. In some embodiments, the system (700) can be utilized to modify the inferred realized topologies. For example, modifying the inferred realized topologies can include: editing, correcting, and/or complementing the inferred realized topologies (e.g., utilizing LCM, policies (303), and/or other information relating to the inferred realized topologies). In some embodiments, the system (700) can be utilized to drive and/or load information from other systems and/or files of the inferred realized topologies. As described herein, the system (700) can also be utilized to manage the inferred realized topologies the same and/or similar way as a system would manage a realized topology and/or a discovered topology. In addition, the system (700) can enable selection of an LCM action. In some embodiments, complementing the topologies can include binding polices (303) to the topologies. For example, complementing the topologies can include binding policies (303) derived from policies on a data center to the same and/or similar node types of the topologies. That is, discovered and/or inferred topologies can be updated by binding policies (303) to a number of nodes of the discovered and/or inferred topologies. Thus, discovered and/or inferred instances of these discovered and/or inferred topologies can be prescribed and managed by the system (700).

Furthermore, the system (700) can include options to draw changes to the topology, the relations, the dependencies, and/or the polices (303). The draw changes can be enacted on the realized topology by the system (700). For example, the draw changes can include an instruction to move a node, duplicate a topology, and/or retire a topology. In some embodiments, the system (700) can approve a remediation that was recommended by a recommendation engine. The options to draw changes to the topology, the relations, the dependencies, and/or the policies (303) can also include changing the code (i.e., not using a designer). In some embodiments, these changes can be made by YAML when the topologies are expressed with a TOSCA YAML profile.

The system (700) can include a catalog (704). In some embodiments, the catalog (704) can include a computer readable medium that can be utilized to store information relating to the cloud system. In some embodiments, the catalog (704) can be utilized to store information relating to deployed systems of the cloud system. Thus the realized topologies may not be initially provisioned by the system (700), but rather updated and/or managed at some point by a different system other than system (700).

The system (700) can include a policy based fulfillment, orchestration, and integration tool (706). The policy based fulfillment, orchestration, and integration tool (706) can include a number of policies (303) that can be utilized for deployment of services on the cloud system. As described herein, the policies (303) can be state and version policies (303), among other policies (303). In some embodiments, the policies (303) are then applied (e.g., applied automatically, applied by complementing, etc.) the realized topologies that are not initially provisioned by the system (700).

The system (700) can include a service and instance repository (708). The service and instance repository (708) can include a computer readable medium that can be utilized to store information relating to a number of services and/or a number of instances from the cloud system. The system (700) can include a model repository (710). The model repository (710) can include a computer readable medium that can store information relating to application models (319) of the cloud system, topologies (302) of the cloud system, instances of the cloud system, environments of the cloud system, and/or desired environments of the cloud system.

The system (700) can include a discovery module (712) that can initiate an automated and/or manual discovery of a topology. As described herein, the discovery module (712) can discover a realized topology and/or an inferred realized topology of the system (700). The system (700) can include a reporting platform (714). The reporting platform (714) can be utilized to send reports of errors and/or reports of the cloud system status. The system (700) can include a common data warehouse (716). The common data warehouse (716) can include a computer readable medium that can be used to store data relating to the reporting platform (714). In some embodiments, the discovery module (712) can be notified of items to discover. For example, if there are changes to the topologies the discovery module (712) can be notified that there were changes implemented to the topologies and notified to discover the topologies. In some embodiments, the system (700) can also be notified of items to discover and then subsequently notify the discovery module (712) what items to discover.

In some embodiments, the system (700) is enabled by a separation of topology design, topology models, and topology templates from realized topology instances. The system (700) can manage a realized instance for which it does not have the model and/or the design. In addition, the system (700) can allow the realized topology to be imported, discovered, and/or modified from an external system and keep track of the realized topologies for managing the realized topologies.

Figure 8:
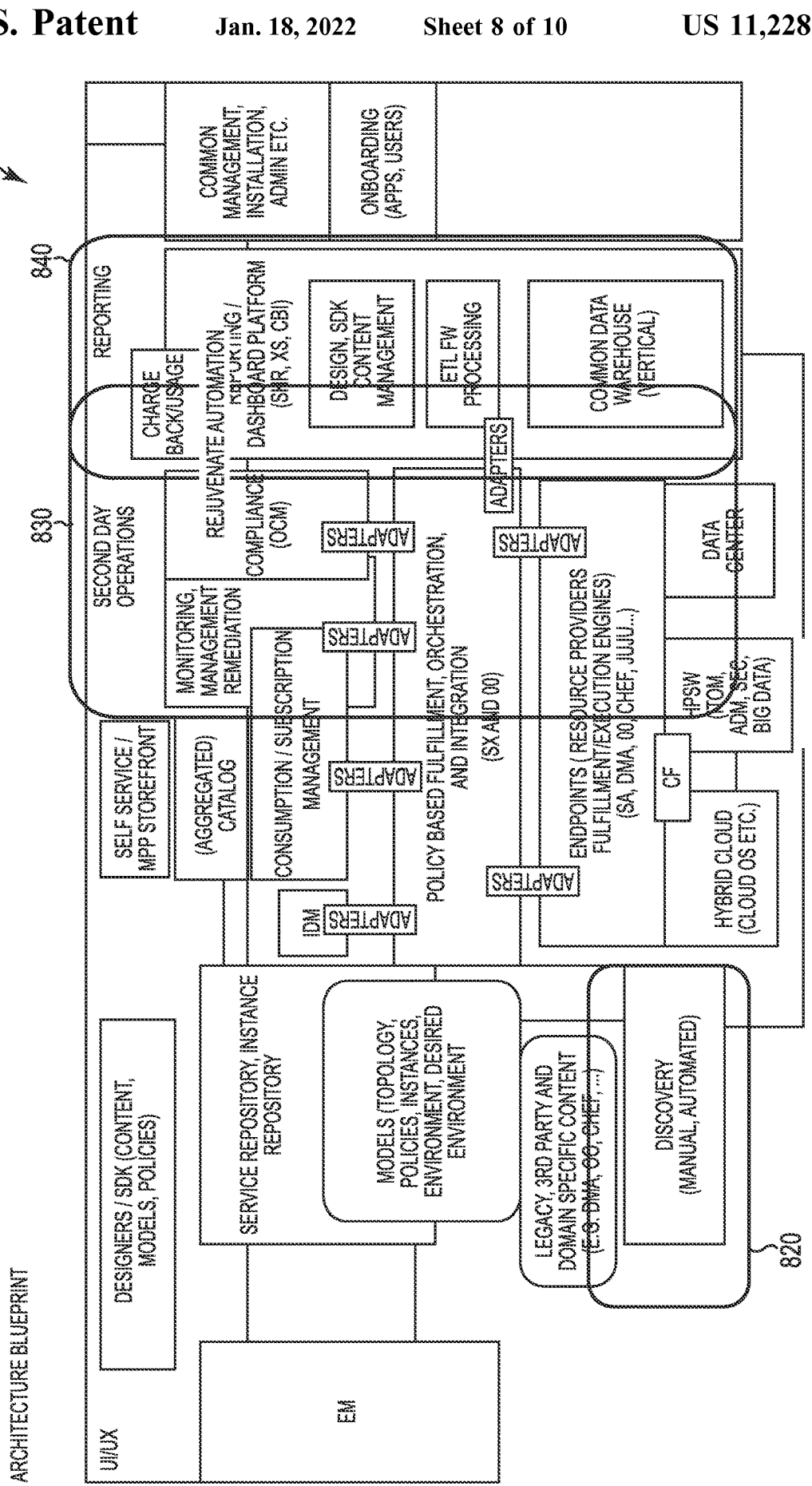
FIG. 8 is an example of a system, according to the present disclosure.

FIG. 8 is an example of a system (800) including components, platforms, and modules illustrated in FIG. 7, according to the present disclosure. The system (800) includes an example architecture of a cloud system as described herein. FIG. 8 is useful for an example method for discovering a topology not provisioned by the management broker (300). System (800) can be utilized in a similar manner as system (700).

As shown in FIG. 8, the system (800) can include a discovery portion (810). The discovery portion (810) can include the discovery module (712) as referenced in FIG. 7. The discovery portion (810) can include portions of the system (800) that are utilized to discover realized topologies and/or inferred realized topologies.

The system (800) includes a second day operations portion (820). The second day operations portion (820) is enabled by this subset of components. As described herein, the second day operations can include operations of a cloud system after development of the hardware, software, and/or logic. For example, the second day operations can include provisioning, using other management tools, or discovering topology provisioned by another to be managed by the management broker (300) as referenced in FIG. 3, and/or managing the cloud system. In some embodiments, as described herein, the system (800) can include a number of different parts including, but not limited to: modeling parts, design parts, provisioning then second day operation, reporting. Thus second day operation (e.g., what is performed after provisioning of a system) can now be performed by the system (800) even though the topologies were not provisioned by the system (800).

The system (800) can include a reporting portion (830). The reporting portion (830) of the system (800) can include elements of the system (800) that are utilized to report errors and/or provide cloud system analysis information.

Figure 9:
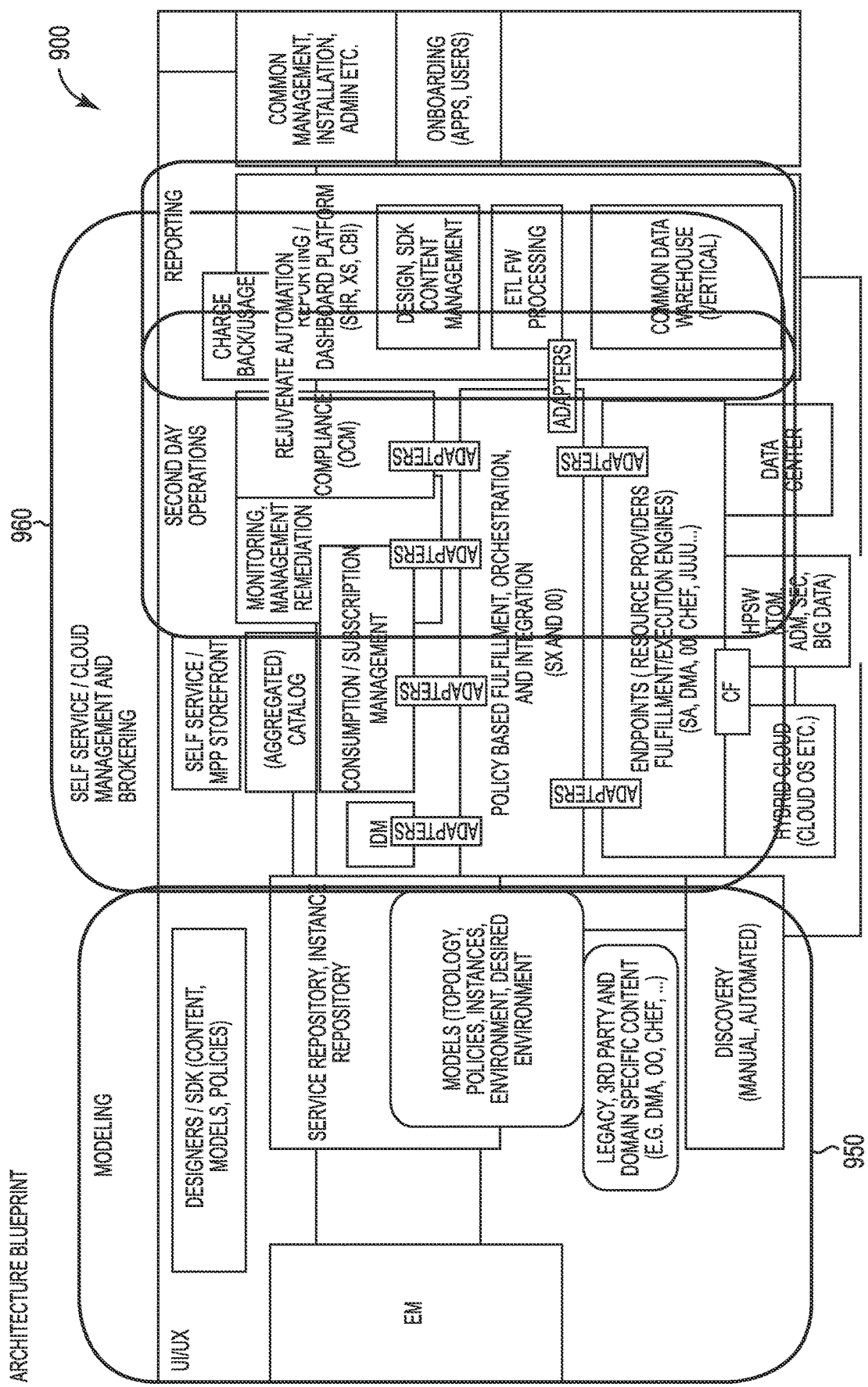
FIG. 9 is an example of a system, according to the present disclosure.

FIG. 9 is an example of an system (900), according to the present disclosure. The system (900) can include a modeling portion (940). The modeling portion (940) can include portions of the system (900) that includes elements of the system (900) that correspond to modeling of the cloud system represented by the system (900). The modeling portion (940) can include the service repository and/or instance repository (708), the discovery module (712), the model repository (710), and/or other elements of a cloud system that can be utilized for modeling the cloud system.

The system (900) can include a cloud management portion (950). The cloud management portion (950) can include elements of the system (900) that can be utilized to service, manage, provision, and/or broker the cloud system as described in connection with FIGS. 1-6.

Figure 10:
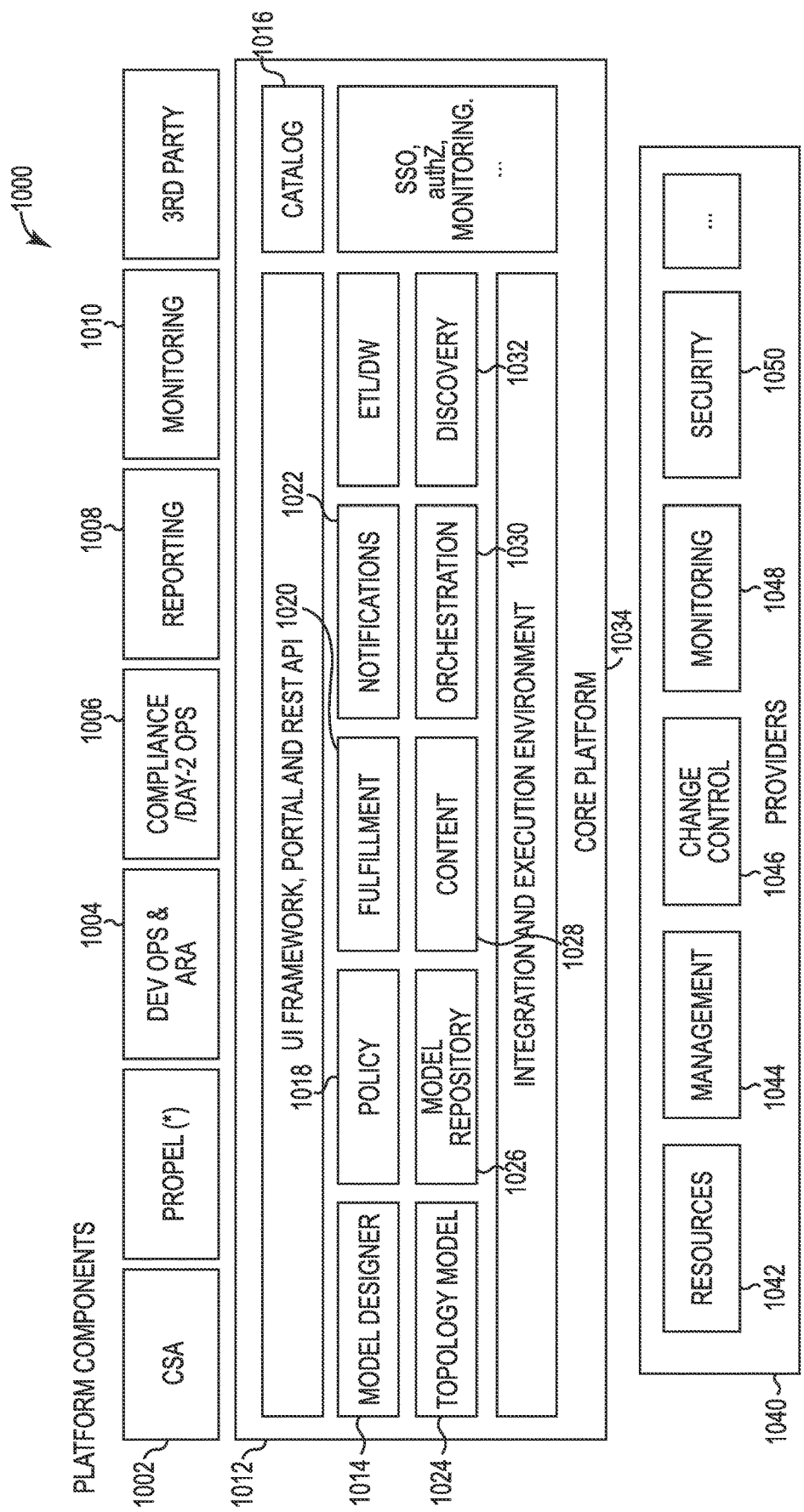
FIG. 10 is a block diagram showing an example platform of components that make up a topology of components associated with nodes of a topology, according to the present disclosure.

FIG. 10 is a block diagram showing an example platform (1000) of components, according to the present disclosure. The platform (1000) includes a plurality of components that can be utilized to provision and manage a cloud system. The platform (1000) can include components that are associated with a topology (302) of the cloud system as described in connection with FIGS. 1-6.

The platform (1000) can include a cloud control and management system for first day operation and management. The platform (1000) can include an integrated or stand-alone development and operations system (1004). The development and application release automation system (1004) that can facilitate the deployment of applications on suitable infrastructure for the stage (e.g., testing, pre-production, production) as well as associated monitoring and remediation.

In some embodiments, a plurality of management solutions can be viewed as applications on the platform (1000). For example, applications such as first day operation and management such as CSA or applications such as second day operations that are typically done in data center can now be moved and shared between the data center and cloud networks.

The platform (1000) can include an integrated or stand-alone reporting system (1008). The reporting system (1008) can report errors that occur in the cloud system. In some embodiments, the reporting system (1008) can generate reports that include information on the operation and functionality of the cloud system.

The platform (1000) can include an integrated or stand-alone monitoring system (910). The monitoring system (1010) can be utilized to monitor performance and status of deployed services of the cloud system. As described herein, the deployed services may have been provisioned and managed or remediated by the application 1002 or by a different system. The monitoring system (1010) can be utilized to monitor a variety of relationships of the cloud system, as described herein.

The platform (1000) can include a core platform (1012) that can include a plurality of features for providing services via the cloud system such as described in connection with FIGS. 1-6. The core platform (1012) can include a user interface (1014). The user interface (1014) can be utilized to display reports from the reporting system (1008) and/or make changes to the platform (1000). The core platform (1012) can include a catalog (1016). The catalog (1016) can include a computer readable medium that can store individual designs, provisions, deploys, and manages such a cloud service that appropriately consists of a number of services, applications, platforms, or infrastructure capabilities deployed, executed, and managed in a cloud environment. As described herein, these designs may then be offered to user who may order, request, and subscribe to them from the catalog (1016).

The core platform (1012) can include a policy service (1018) that can manage, process, and store/bind a number of policies (303). The number of policies (303) can include stage and version policies, provider selection policies, security policies, access control policies, monitoring policies, event processing policies, notification policies, and/or remediation policies, among various other policies that can be managed, process, and/or stored/bound. The core platform (1012) can include a fulfillment engine service (1020). The fulfillment engine (1020) can include a number of methods for fulfilling requests, provisioning, and/or updating requests of the cloud system while also following the guidance of the policies that apply.

The core platform (1012) can include a notification service (1022). The notification service (1022) can include an event handler and can process events (e.g., process events with corresponding policies) to extract incidents and send the incident depending on policies to notify a user. In some embodiments, the notification service (1022) can notify with remediation recommendations. In some embodiments, the notification service (1022) can notify with a remediation menu to remediate. In some embodiments, the notification service (1022) can send notifications to accept or to remediate differently than the remediation recommendations. Furthermore, in some embodiments, the notification service (1022) can notify a user that a remediation has taken place. The notifications service (1022) can include a computer readable medium to store notifications and/or reports generated by the reporting system (1008) such as described in FIGS. 1-6. The notifications database (1022) is a logical system repository of realized topologies (314) and/or inferred realized topologies, and may be any form of data repository.

The core platform (1012) can include a topology model (1024). The topology model (1024) can include a model representation of a number of topologies (302). The topology model (1024) can be utilized to provision and/or manage the cloud system. The core platform (1012) can include a model repository (1026). In some embodiments, the model repository (1026) can be a model and instance repository to store system models, topologies (302), and/or instances. The model repository (1026) can include a computer readable medium that can be utilized to store a number of system models and/or topologies (302).

The core platform (1012) can include a content repository (1028). In some embodiments, the content repository (1028) can be utilized to design topology services and/or policies. In addition, the content repository (1028) can be utilized to implement resource providers or LCMA. The content repository (1028) can include a computer readable medium that can be utilized to store content from the cloud system. The core platform (1012) can include an orchestration system (1030). The orchestration system (1030) can be utilized to provision and/or manage services provided by the cloud system such as described in connection with FIGS. 7-9.

The core platform (1012) can include a discovery system (1032). The discovery system (1032) can be utilized to discover topologies (302) for the cloud system. In addition, the discovery system (1032) can be utilized in discovering realized topologies and/or inferred realized topologies as described herein in connection with FIGS. 7-9 as well as changes performed by external systems to existing instances. The core platform (1012) can include an integration and execution environment (1034). The integration and execution environment (1034) can include an execution platform that can be utilized to execute services on the cloud system as well as the applications and services running in/on the platform (1000).

The platform (1000) can include a provider portion (1040). The provider portion can include resource provider policies (308-1) as described herein that are any policies associated with a number of resource providers' offerings that guide the selection of a number of resources. The provider portion (1040) can include resources (1042), management (1044), change control (1046), monitoring (1048), security (1050), among other providers. The resources (1042) can include networking resources that can provide services via the cloud system. The management (1044) can be utilized to manage the provisioning of services on the cloud system. The management (1044) can be performed by third party offering in FIG. 3. The change control (1046) can be utilized for manual changes to the cloud system and/or manual changes to the topologies (302). Monitoring (1048) can include networking monitors to monitor provisioning and deployment of resources on the cloud system. Security (1050) can include stand-alone or third party network security elements that can be used to prevent a variety of security risks.

The systems and methods as described herein make it possible to manage cloud services that are provisioned and/or managed differently. For example, the systems and methods as described herein can provide for instantiating, provisioning, and/or managing a cloud system for second day operation without first day operation. That is, the systems and methods described herein provide for instantiating, provisioning, and/or managing a cloud system when the applications were developed by the manager and managed by the manager. In addition, the systems and methods described herein provide for instantiating, provisioning, and/or managing a cloud system when the applications were not developed by the manager and the topologies are inferred topologies and/or inferred realized topologies that are discovered as described herein. Furthermore, the systems and methods described herein provide for instantiating, provisioning, and/or managing a cloud system when the applications were developed by a manager, but the cloud service is managed by a different management broker (300) as referenced herein.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:
1. A method, comprising:
associating, by a computer, a topology with an application, wherein the topology comprises a plurality of nodes;
determining, by the computer, stage and version policies of the application to define an available infrastructure for each stage of a number of stages of the application and each version of a number of versions of the application, wherein the stages comprise stages of development of the application or stages of deployment of the application;
associating, by the computer, a number of nodes of the plurality of nodes with a given stage of the number of stages based on a given stage and version policy of the stage and version policies, wherein associating the number of nodes comprises associating a given node of the plurality of nodes with the given stage of the number of stages based on a geographical location constraint restricting or allowing placement of the given node of the plurality of nodes specified by the given stage and version policy or a topological layer constraint for the given node of the plurality of nodes specified by the given stage and version policy; and provisioning, by the computer, the number of nodes for the given stage of the number of stages of the application based on an association of the number of nodes of the plurality of nodes,
wherein each node of the plurality of nodes is defined based on a blueprint comprising a functional description of a configuration and connectivity between the plurality of nodes prior to associating the topology with the application.

2. The method of claim 1, wherein associating the number of nodes with the given stage includes defining the topology and associating the number of nodes with the given stage in code.

3. The method of claim 1, further comprising evolving the application from a first stage and version policy to a second stage and version policy based on changing properties of the application.

4. The method of claim 1, wherein the given stage and version policy comprises:
information representing requirements per stage for a number of layers of the topology of the application; and
information representing guidance for selecting the number of layers.

5. The method of claim 1, wherein the topology and the stage and version policies are written in YAML.

6. The method of claim 1, wherein provisioning the number of nodes includes packaging an application artifact, the topology, and the stage and version policies to trigger provisioning from IDE in development, testing, preproduction and production of the application.

7. The method of claim 1, comprising requesting, via a development tool chain, to provision and manage the application at a specific stage of the number of stages for testing the application during different steps of preproduction and production.

8. The method of claim 1, further comprising instantiating the topology based on the stage and version policy associated with a stage and a version of the application.

9. The method of claim 1, wherein each stage of the number of stages and each version of the number of versions in the stage and version polices is independent.

10. A system, comprising:
a platform to develop, test, stage, execute, and support cloud service management, the platform comprising at least one processor and a memory to store instructions that, when executed by the at least one processor, cause the at least one processor to:
associate a topology with an application, wherein the topology comprises a plurality of nodes;
determine a number of stage and version policies of the application to define an available infrastructure for each stage of a number of stages of the application and each version of a number of versions of the application, wherein the number of stages comprise stages of development of the application or stages of deployment of the application;
associate a number of nodes of the plurality of nodes with a given stage of the number of stages based on a given stage and version policy of the stage and version policies, wherein associating the number of nodes of the plurality of nodes comprises associating a given node of the plurality of nodes with the given stage of the number of stages based on a geographical location constraint restricting or allowing placement of the given node of the plurality of nodes specified by the given stage and version policy or a topological layer constraint for the given node of the plurality of nodes specified by the given stage and version policy; and
provision the number of nodes of the plurality of nodes for the application for the given stage of the number of stages of the application based on an association of the number of nodes of the plurality of nodes,
wherein each node of the plurality of nodes is defined based on a blueprint comprising a functional description of a configuration and connectivity between the plurality of nodes prior to associating the topology with the application.

11. The system of claim 10, wherein the stage and version policies guide provisioning and management for each corresponding stage and version of the application.

12. The system of claim 10, wherein the topology comprises cloud services that are managed by the platform.

13. The system of claim 10, wherein the instructions, when executed by the at least one processor, further cause the at least one processor to execute a lifecycle management process to instantiate a service based on a number of stage and version policies.

14. The system of claim 10, wherein the instructions, when executed by the at least one processor, further cause the at least one processor to manage the application based on a number of stage and version policies.

15. The system of claim 10, wherein each stage of the number of stages and each version of the number of versions in the stage and version polices is independent.

16. A non-transitory storage medium to store machine readable instructions that, when executed by a machine, cause the machine to:
associate a topology with an application, wherein the topology comprises a plurality of nodes;
determine a number of stage and version policies of the application to define an available infrastructure for each stage of a number of stages of the application and each version of a number of versions of the application, wherein the number of stages comprise stages of development of the application or stages of deployment of the application;
associate a number of nodes of the plurality of nodes with a given stage of the number of stages based on a given stage and version policy of the stage and version policies, wherein associating the number of nodes of the plurality of nodes comprises associating a given node of the plurality of nodes with the given stage of the number of stages based on a geographical location constraint restricting or allowing placement of the given node of the plurality of nodes specified by the given stage and version policy or a topological layer constraint for the given node specified by the given stage and version policy; and
provision the number of nodes for the application for the given stage of the application based on an association of the number of nodes of the plurality of nodes,
wherein each node of the plurality of nodes is defined based on a blueprint comprising a functional description of a configuration and connectivity between the plurality of nodes prior to associating the topology with the application.

17. The non-transitory storage medium of claim 16, wherein each stage of the number of stages and each version of the number of versions in the stage and version polices is independent.

18. The non-transitory storage medium of claim 16, wherein associating the number of nodes with the given stage includes defining the topology and associating the number of nodes with the given stage in code.

19. The non-transitory storage medium of claim 16, wherein the given stage and version policy comprises:
   information representing requirements per stage for a number of layers of the topology of the application; and
   information representing guidance for selecting the number of layers.

20. The non-transitory storage medium of claim 16, wherein the topology and the stage and version policies are written in YAML.

* * * * *